(12) United States Patent
Ljung

(10) Patent No.: US 12,294,971 B2
(45) Date of Patent: May 6, 2025

(54) SYSTEM, A POSITIONING DEVICE, A SLAVE ANCHOR ELECTRONIC DEVICE, AND RELATED METHODS

(71) Applicant: Sony Group Corporation, Tokyo (JP)

(72) Inventor: Peter Ljung, Helsingborg (SE)

(73) Assignee: Sony Group Corporation, Tokyo (JP)

( * ) Notice: Subject to any disclaimer, the term of this patent is extended or adjusted under 35 U.S.C. 154(b) by 356 days.

(21) Appl. No.: 17/885,842

(22) Filed: Aug. 11, 2022

(65) Prior Publication Data
US 2023/0106904 A1    Apr. 6, 2023

(30) Foreign Application Priority Data
Sep. 29, 2021  (SE) .................................. 2151193-6

(51) Int. Cl.
*H04W 64/00*    (2009.01)
*H04B 1/7163*    (2011.01)
*H04W 52/02*    (2009.01)

(52) U.S. Cl.
CPC ........ *H04W 64/003* (2013.01); *H04B 1/7163* (2013.01); *H04W 52/0251* (2013.01)

(58) Field of Classification Search
CPC ............ H04W 64/003; H04W 52/0251; H04B 1/7163
See application file for complete search history.

(56) References Cited

U.S. PATENT DOCUMENTS 10,924,157 B2    2/2021  Torborg
2015/0091702 A1   4/2015  Gupta et al.
2016/0050624 A1   2/2016  Tirronen
2020/0287590 A1*  9/2020  Torborg ............... H04B 1/7183
2021/0159938 A1   5/2021  Subraveti
2022/0174626 A1*  6/2022  Yang ..................... G01S 1/0428

FOREIGN PATENT DOCUMENTS

WO    2016193897 A1   12/2016
WO    2017196584 A1   11/2017

OTHER PUBLICATIONS

Office Action and Search Report from corresponding Swedish Application No. 2151193-6, mailed on May 9, 2022, 12 pages.
Nicola Macoir et al., "Demo: Low power, portable and infrastructure light indoor UWB ranging solution", IEEE International Conference on Information Processing in Sensor Networks, Apr. 16-18, 2019, 2 pages.

* cited by examiner

*Primary Examiner* — Kevin Kim
(74) *Attorney, Agent, or Firm* — Tucker Ellis LLP

(57) ABSTRACT

A method for determining a position of a positioning device, for synchronization of positioning devices, and/or for synchronization of slave anchor electronic devices. The method is performed by a system having a master anchor electronic device, and a plurality of slave anchor electronic devices including a first slave anchor electronic device. The method includes broadcasting, from the master anchor electronic device, a first ultra-wide band (UWB) signal, at a first predetermined time. The method includes receiving, at the first slave anchor electronic device, the first UWB signal. The method includes determining, at the first slave anchor electronic device, a first transmission time based on the first UWB signal. The method includes broadcasting, from the first slave anchor electronic device, a second UWB signal at the first transmission time.

9 Claims, 7 Drawing Sheets

SYSTEM, A POSITIONING DEVICE, A SLAVE ANCHOR ELECTRONIC DEVICE, AND RELATED METHODS

RELATED APPLICATION DATA

This application claims the benefit of Swedish Patent Application No. 2151193-6, filed Sep. 29, 2021, the disclosure of which is incorporated herein by reference in its entirety.

TECHNICAL FIELD

The present disclosure pertains to the field of positioning and synchronization. The present disclosure relates to a system, a positioning device, a slave anchor electronic device and related methods.

BACKGROUND

There exist many different positioning techniques to determine an absolute position of electronic devices (such as an indoor position). Real-time locating systems, RTLS, and specifically indoor positioning technology is under active development. Different solutions have different trade-offs and advantages. In most indoor positioning systems, an infrastructure is required for the positioning to function. For example, positioning may be determined using a number of different techniques such as measurement of time of flight of a signal, round trip time measurement between two nodes, arrival time of a specific signal to different nodes. These techniques may be deployed using a number of different mediums such as radio waves, for example Bluetooth, Wi-Fi, ultra-wide band, UWB, light waves (such as infra-red light), and/or sound waves (such as ultra-sonic sound). Other techniques attempt to create infrastructure-free indoor positioning systems using sensing of natural environment, such as measured magnetic field and fingerprinting.

SUMMARY

RTLS asset tracking infrastructure may include systems using Wi-Fi access points. However, the systems using Wi-Fi access points are often not optimized for RTLS performance and provide poor positioning accuracy. RTLS asset tracking infrastructure may include infrastructure based on Bluetooth Low Energy, such as using on a Received Signal Strength Indicator, RSSI, and/or Phase and/or time of flight, ToF. However, infrastructure based on Bluetooth Low Energy (BLE) with these techniques may provide positioning that is still not sufficiently accurate. RTLS asset tracking infrastructure may include UWB-based infrastructure. However, the UWB-based infrastructure may require direct Ethernet cabling to provide exact time synchronization and/or as power supply, and may provide a high positioning accuracy. The techniques still suffer from quite poor positioning accuracy and robustness, and high power consumption.

Accordingly, there is a need for positioning devices, slave anchor electronic devices, and methods performed by a system comprising a master anchor electronic device, and a plurality of slave anchor electronic devices, which mitigate, alleviate or address the shortcomings existing and provide an improved positioning of positioning devices (such as in a configuration with slave anchor electronic device and a master anchor electronic device), with improved precision, improved power consumption, and improved scalability.

A method is disclosed. The method is performed by a system comprising a master anchor electronic device, and a plurality of slave anchor electronic devices including a first slave anchor electronic device. The method comprises broadcasting, from the master anchor electronic device, a first ultra-wide band, UWB, signal, at a first predetermined time. The method comprises receiving, at the first slave anchor electronic device, the first UWB signal. The method comprises determining, at the first slave anchor electronic device, a first transmission time based on the first UWB signal. The method comprises broadcasting, from the first slave anchor electronic device, a second UWB signal at the first transmission time.

It is an advantage of the disclosed system and related method that an improved synchronization (such as time synchronization) in a system comprising a master anchor electronic device, and a plurality of slave anchor electronic device is provided, such as improved synchronization of the slave anchor electronic devices. The time synchronization in the system may be performed in a more efficient and faster manner, such as in a power efficient and faster manner.

It is an advantage of the disclosed system and related method that it enables a positioning device to be positioned with an improved positioning, such as in a configuration with a plurality of slave anchor electronic device. For example, the present disclosure allows to improve the accuracy and/or precision of the positioning of the positioning device.

In demanding environments like in industry environments some radio-based solution like Bluetooth low energy, BLE, RSSI based solutions are unusable due to multi path effects which are very prominent in mostly metallic and radio reflective environments. It may be appreciated that the present disclosure provides an improved accuracy and an improved robustness against multi-path disturbance using multi-path rejection. Further, it may be appreciated that the present disclosure provides an improved accuracy and an improved robustness in environments with radio reflections. It may be appreciated that the present disclosure provides systems using UWB with an improved power consumption, such as by improving power management of the positioning device, the master anchor electronic device and/or the slave anchor electronic device without negatively affecting the accuracy of the positioning. The improved power consumption allows for non-connected (such as light-powered) infrastructure.

Further, it is an advantage of the disclosed system and related method that the system may be configured without the need for cabled power supply, providing an improved flexibility and scalability, for example for the use of UWB in environments where power is not easily accessible and/or to simplify installation costs in any environment.

Further, it is an advantage of the disclosed system and related method that the system may be configured with an improved scalability. For example, in industry environments and/or office buildings it is difficult to setup and maintain a powered infrastructure due to limited access to power, such as due to long distances to ceiling compared with an office environment.

Further, a positioning device is provided. The positioning device comprises processor circuitry, memory circuitry, and a wireless interface. The positioning device is configured to receive a radio synchronization signal. The positioning device is configured to determine a first positioning event based on the radio synchronization signal. The positioning device is configured to entering a power saving state until the first positioning event.

It is an advantage of the disclosed positioning device that it enables a positioning device to be positioned with an improved positioning (such as in a configuration with a plurality of slave anchor electronic device), for example in terms of accuracy and/or precision of the positioning of the positioning device. It may be appreciated that the disclosed positioning device provides an improved accuracy and an improved robustness against multi-path disturbance using multi-path rejection, for example in comparison with some radio based solution, like BLE RSSI based solutions, which are unusable due to multi path effects very prominent in mostly metallic and radio reflective environments.

It may be appreciated that the present disclosure provides positioning devices with an improved power consumption using UWB, such as by improving power management of the positioning device.

The disclosed positioning device may benefit from being anonymous, private and/or integrity protected as the disclosed positioning device is passive.

BRIEF DESCRIPTION OF THE DRAWINGS

The above and other features and advantages of the present disclosure will become readily apparent to those skilled in the art by the following detailed description of examples thereof with reference to the attached drawings, in which.

DETAILED DESCRIPTION

Figure 1:
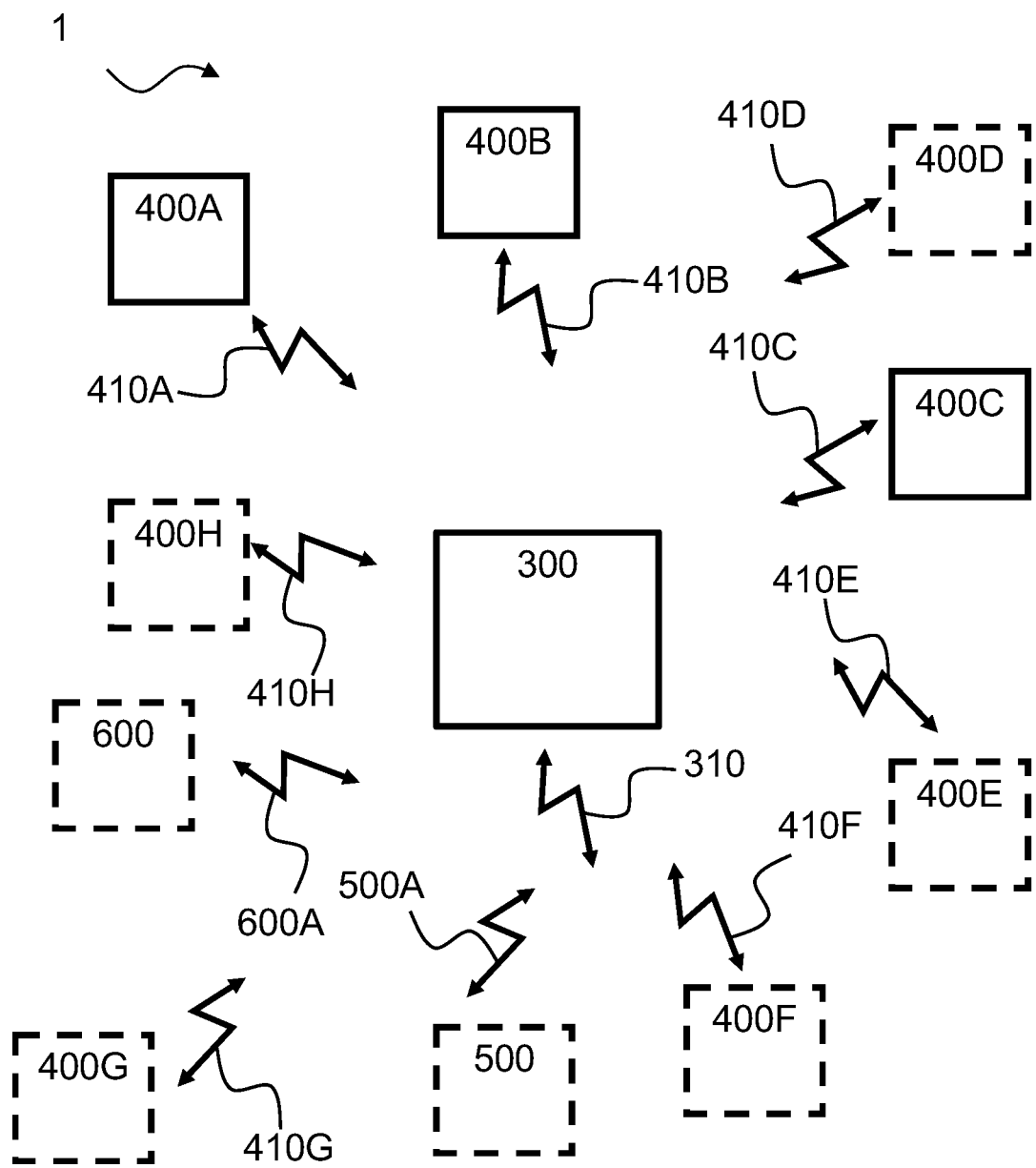
FIG. 1 is a schematic representation illustrating an example system according to one or more embodiments of this disclosure.

Various examples and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the examples. They are not intended as an exhaustive description of the disclosure or as a limitation on the scope of the disclosure. In addition, an illustrated example need not have all the aspects or advantages shown. An aspect or an advantage described in conjunction with a particular example is not necessarily limited to that example and can be practiced in any other examples even if not so illustrated, or if not so explicitly described.

The figures are schematic and simplified for clarity, and they merely show details which aid understanding the disclosure, while other details have been left out. Throughout, the same reference numerals are used for identical or corresponding parts.

FIG. 1 is a schematic representation illustrating an example system 1 according to one or more embodiments of this disclosure. The system 1 comprises a master anchor electronic device 400A and a plurality of slave anchor electronic devices 400B-H including a first slave anchor electronic device 400B. Optionally, the system 1 comprises a positioning device, such as a first positioning device 300. The system 1 may be seen as a positioning system, such as a location system, a real-time location system, and/or a real-time asset tracking system. The system 1 may be seen as a location system, such as using time difference of arrival, TDOA. The system 1 may be seen as comprising an anchor electronic device infrastructure. The system 1 and/or the first positioning device 300 may comprise pre-configured information such as one or more of: locations of anchor electronic devices (such as slave and master anchor electronic devices), and a map with the locations of anchor electronic devices. For example, the map may associate the location of each anchor electronic device with a corresponding anchor identity. The pre-configured information may include distance between slave anchor electronic device, timing information, and/or order between slave anchor electronic device.

The plurality of slave anchor electronic devices may comprise N slave anchor electronic devices, wherein N is an integer ranging from 2 to 10000, for example ranging from 2 to 1000, 5 to 500, 10 to 250, 20 to 100, 5 to 10000, 10 to 10000, 100 to 10000, 5 to 1000, 10 to 1000, 20 to 1000, 10 to 500, 20 to 500, 20, 250, 2 to 100, 5 to 100, 10 to 100, and/or 20 to 100. The number N of slave anchor electronic devices may for example vary depending on the size of the system and/or an area where the positioning device has to be positioned, a precision of the positioning, and/or a pattern of the slave anchor electronic devices.

A positioning device disclosed herein may be seen as a device used for positioning, such for positioning an object, such as an asset. For example, a positioning device may be seen as a tag device (such as an asset tag), and/or a beacon device (for example, a static beacon, for example installed in a building). In UWB systems, the positioning device may be called an anchor device. The first positioning device 300 may comprise a tag device. It may be appreciated that a positioning device may be used for asset tracking. For example, a positioning device may be seen as a tag attached to objects and/or people, such as for tracking through portable electronic devices, such as mobile phones. It may be appreciated that the present disclosure may allow the use of UWB with simple and/or cordless infrastructure.

A positioning device may be used in any kind of asset tracking systems, such as logistics, material tracking, equipment tracking, forklift tracking, safety systems, autonomous vehicle tracking in industry, healthcare systems, and/or in homes.

The present disclosure may be advantageous in home applications where the possibilities and/or incentive to install complicated infrastructure may be low.

In one or more examples, the positioning device may be configured to perform wireless communications, such as using one or more of: UWB, Bluetooth (such as BLE), ZigBee, infrared, and DASH7.

For example, in BLE, tags may be called asset tags. For example, when BLE devices are used as infrastructure, the anchor electronic devices disclosed herein may be called beacons. It may be appreciated that in BLE, the same beacon device may either be used as part of infrastructure or as an asset tag. For example, in some scenarios, beacons may be used as part of infrastructure as landmarks used to help position, such as mobile phones. For example, in other scenarios, the beacons may be used as movable asset tags that are tracked by the infrastructure consisting of beacon readers which can be called observers.

The positioning device may be a light-powered cell, for example, in form of a thin tag, in that the light-powered cell may have a dimension in the range of 10×10 mm.

A slave anchor electronic device may be seen as a computing device configured to communicate with one or more positioning devices and/or master anchor electronic devices. A slave anchor electronic device (such as a first slave anchor electronic device 400B) may be configured to support a positioning or location system 1 in obtaining a position of the first positioning device 300. A slave anchor electronic device (such as the first slave anchor electronic device 400B) may be configured to communicate using a wireless communication system, such as an UWB system. For example, a slave anchor electronic device listens for signals from a master anchor electronic device, and/or a positioning device. For example, a slave anchor electronic device may have a static position and may be used for scanning for the positioning device(s). A slave anchor electronic device disclosed herein may be seen as an anchor device, a reader device, and/or a gateway device and/or a Fixed Reference Point device.

The first slave anchor electronic device 400B may comprise memory circuitry (not shown), processor circuitry (not shown), and a wireless interface (not shown).

A master anchor electronic device may be seen as a computing device configured to communicate with one or more positioning devices and/or slave anchor electronic devices. A master anchor electronic device (such as the master anchor electronic device 400A) may be configured to support a positioning or location system 1 in obtaining a position of the first positioning device 300. A master anchor electronic device (the master anchor electronic device 400A) may be configured to communicate using a wireless communication system, such as an UWB system. For example, a master anchor electronic device listens for signals from a slave anchor electronic device and/or a positioning device. For example, a master anchor electronic device may hold static position and may be used for scanning for the positioning device(s).

The master anchor electronic device 400A may comprise memory circuitry (not shown), processor circuitry (not shown), and a wireless interface (not shown). The master anchor electronic device 400A is configured to broadcast, such as using the processor circuitry and/or via the interface, a first ultra-wide band, UWB, signal 410A, for example, at a first predetermined time. The first UWB signal 410A may be seen as a signal transmitted using UWB, such as a "blink" signal.

The master anchor electronic device 400A may be configured to be in a power saving state as a default state and may be configured to wake up at the first predetermined time for synchronization of the slave anchor electronic devices and/or the first positioning device. The master anchor electronic device 400A may be configured to transmit the first ultra-wide band, UWB, signal 410A. In some embodiments, the first UWB signal 410A may be indicative of or comprise time synchronization information for the plurality of slave anchor electronic devices 400B-400H, and/or time synchronization information for the first positioning device 300.

The first predetermined time may be pre-configured on the master anchor electronic device 400A and/or any of the slave anchor electronic devices 400B-400H. The first UWB signal 410A may comprise a master identity parameter indicative of the master anchor electronic device identity. An UWB signal, such as the first UWB signal may have a duration that is below or equal to 150 µs.

The first slave anchor electronic device 400B is configured to receive, such as using the processor circuitry and/or via the interface, the first UWB signal 410A. The first UWB signal 410A may allow the first slave anchor electronic device 400B to synchronize (such as synchronize in time) with the system 1, such as to synchronize with the master anchor electronic device 400A. An internal clock of the first slave anchor electronic device 400B may be updated based on the first UWB signal. A slave anchor electronic device may have, as a default state, a power saving state. In other words, a slave anchor electronic device may be configured to enter an activation state only for receiving a signal. For example, each slave anchor electronic device is to be in a power saving state with only an alarm setup for wake up at the first predetermined time and/or for a next positioning event.

In one or more example systems and/or slave anchor electronic device, prior to receiving the first UWB signal, the first slave anchor electronic device 400B is configured to enter an activation state of the first slave anchor electronic device 400B at a predetermined activation time. In other words, the first slave anchor electronic device 400B is configured to enter an activation state at a predetermined activation time to receive the first UWB signal 410A. In other words, the first slave anchor electronic device 400B is configured to wake up at a predetermined activation time to receive the first UWB signal 410A in line with the first predetermined time. The predetermined activation time may be pre-configured on the first slave anchor electronic device 400B. In other words, the plurality of slave anchor electronic devices 400B-400H may be pre-synchronized by default. In one or more example systems, each slave anchor electronic device of the system is configured to enter an activation state at a predetermined activation time to receive the first UWB signal. The first slave anchor electronic device 400B may be configured to listen for a signal at the predetermined activation time. The first slave anchor electronic device 400B may receive the first UWB signal 410A at a time that takes into account the first predetermined time and the time that it takes for the first UWB signal 410A to arrive at the first slave anchor electronic device 400B.

A slave anchor electronic device, such as the first slave anchor electronic device 400B, may be configured to set an alarm to enter an activation state, such as to set an alarm to wake up, at the first positioning event based on the first positioning event.

In one or more example systems and/or slave anchor electronic device, it may be possible depending on a frequency of the positioning event, stability of slave anchor electronic device clock reference, and/or power consumption for keeping a high accuracy time reference running between positioning events, that the slave anchor electronic devices do not need to listen for the master anchor electronic device at every positioning event. It may be appreciated that the slave anchor electronic devices may be allowed to broadcast (such as transmit) UWB signals (such as blink messages) at pre-defined delays from the first UWB signal. In other words, the slave anchor electronic devices may not need to synchronize with the master anchor electronic device at every positioning event. This may allow to save power at the slave anchor electronic devices. Each of the plurality of slave anchor electronic devices may be associated with different predetermined activation times (such as wake-up state).

In one or more example systems and/or slave anchor electronic device, the first slave anchor electronic device 400B is configured to enter a power saving state of the first slave anchor electronic device 400B. A slave anchor electronic device may have, as a default state, a power saving state. In other words, a slave anchor electronic device may be configured to enter an activation state only for receiving a signal. The first slave anchor electronic device may be configured to enter a power saving state, until receiving the first UWB signal, between the reception of the first UWB signal and the broadcasting of a second UWB signal, and/or after broadcasting a second UWB signal.

The first slave anchor electronic device 400B is configured to determine, such as using the processor circuitry, a first transmission time based on the first UWB signal. In other words, the first slave anchor electronic device 400B is configured to determine the first transmission time based on the received first UWB signal 410A, such as based on the time of reception of the first UWB signal 410A. The first transmission time may be determined based on the first UWB signal 410A and/or a pre-configured time period/time slot for the first slave anchor electronic device 400B to transmit/broadcast at. The first transmission time may comprise and/or be based on a first delay of the first slave anchor electronic device. The first transmission time may be based on the reception time of the first UWB signal plus a predetermined delay of the first slave anchor electronic device 400B.

The first slave anchor electronic device 400B is configured to broadcast, such as using the processor circuitry and/or via the interface, a second UWB signal 410B at the first transmission time. The second UWB signal 410B may be seen as a "blink" signal. The slave anchor electronic device 400B may be configured to transmit the second ultra-wide band, UWB, signal 410B. The second UWB signal 410B may comprise a slave identity parameter indicative of the slave anchor electronic device identity.

In one or more example systems and/or slave anchor electronic device, prior to broadcasting the second UWB signal, the first slave anchor electronic device 400B is configured to wait a predetermined waiting time. The predetermined waiting time may be based on the first UWB signal and/or a preconfigured delay parameter. Each of the plurality of slave anchor electronic devices may comprise a pre-configured time period/time slot for transmission and/or broadcast. In one or more examples, the pre-configured time period/time slot for transmission and/or broadcast at may be different for each slave anchor electronic device to allow differentiation between the slave anchor electronic devices and/or to allow differentiation between the signals transmitted/broadcasted by the slave anchor electronic devices. In other words, in one or more examples, there may be a delay between the broadcasting/transmission of each UWB signal from the plurality of slave anchor electronic devices. In one or more example systems and/or slave anchor electronic device, the signals from the plurality of slave anchor electronic devices may partially overlap, such as quasi simultaneous responses from the plurality of slave anchor electronic devices. The signals from the plurality of slave anchor electronic devices may be configured to be transmitted and/or broadcasted such that the signals do not interfere with each other.

Figure 2:
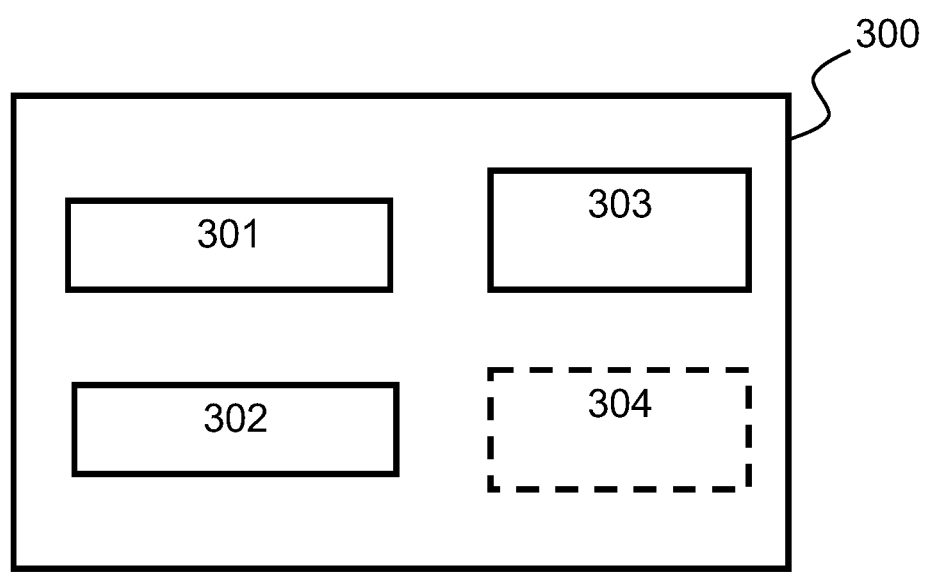
FIG. 2 is a block diagram illustrating an example positioning device according to this disclosure.

In one or more example systems, the first positioning device 300 is configured to receive, such as using a processor circuitry and/or via a wireless interface of the first positioning device (such as processor circuitry 302 and/or via the interface 303 of FIG. 2), a radio synchronization signal indicative of a first positioning event. In other words, the first positioning device may listen to a radio synchronization signal. The radio synchronization signal may for example be transmitted over a radio configured to communicate with lower power than that of UWB, such as power efficient narrow band radio, BLE, ZigBee, infrared, and/or DASH7. The radio synchronization signal may for example be transmitted at 2.4 GHz and/or below or equal to 1 GHz. By receiving the radio synchronization signal the first positioning device may synchronize for the first positioning event.

A positioning event, such as the first positioning event, may be seen as an event where a positioning device, such as the first positioning device 300, has the opportunity to receive a plurality of signals from the plurality of slave anchor electronic devices in order to determine the position of the positioning device. In one or more example systems, a positioning device, such as the first positioning device, may already comprise information on the next positioning event, such as the first positioning event. When the clock of the first positioning device is stable, the first positioning device may not need to receive a radio synchronization signal.

In one or more example systems, the system comprises a time reference node 500. The time reference node 500 may be a separate electronic device comprising processor circuitry, memory circuitry, and a wireless interface. In one or more example systems, the time reference node 500 is configured to broadcast the radio synchronization signal 500A. The time reference node 500 may be configured to receive the first UWB signal. The time reference node 500 may comprise a radio configured to communicate with lower power than that of UWB, (such as an ultra-low power wake-up radio, such as a power efficient narrow band radio, for example operating at 2.4 GHz and/or below or equal to 1 GHz, such as BLE, ZigBee, infrared, and/or DASH7), to further save power at the first positioning device 300. In one or more example systems, the first positioning device 300 may transmit a signal, such as a query message, to the time reference node 500 to initiate a broadcast from the time reference node 500.

In one or more example systems, the master anchor electronic device 400A acts as the time reference node. When the master anchor electronic device 400A acts as the time reference node, the master anchor electronic device 400A may broadcast the radio synchronization signal, such as time reference, periodically (such as by 10 Hz) to allow the first positioning device 300 to synchronize to the next positioning event.

In one or more example systems, the first positioning device 300 is configured to determine, such as using the processor circuitry 302, the first positioning event based on the radio synchronization signal. The first positioning event may be determined based on a synchronization of the first positioning device 300 based on the radio synchronization signal. The first positioning event may be determined based on a synchronization of the first positioning device 300, based on the radio synchronization signal, and/or based on a pre-configuration of the first positioning device 300 comprising information indicative of a timing of the positioning event(s).

In one or more example systems, the first UWB signal comprises information indicative of a next positioning event. For example, the first UWB signal may comprise information indicating a frequency or period of positioning events and/or that a frequency or period of positioning events has changed, such as from every 1 s to every 2 s. The radio synchronization signal may be used to adjust and/or synchronize an internal clock of the first positioning device 300.

In one or more example systems, the first positioning device 300 is configured to enter, such as using the processor circuitry 302, a power saving state of the first positioning device 300 until the first positioning event. The first positioning device 300 may be configured to set an alarm to enter an activation state, such as to set an alarm to wake up, at the first positioning event based on the determination of the first positioning event. The first positioning device 300 may be configured to enter a power saving state after receiving the radio synchronization signal, after obtaining/determining the first positioning event, and/or after transmitting the time data to a location server 600 and/or to one of the anchor electronic devices. The first positioning device 300 may be configured to be in a power saving state by default.

An activation state as defined herein, may be seen as an operation state wherein a data transmission can be communicated for example between a positioning device and a slave anchor electronic device, a master anchor electronic device, a time reference node, and/or a location server, between a master anchor electronic device and a slave anchor electronic device and/or a time reference node, and/or between a slave anchor electronic device and a time reference node. An activation state may be seen as an operation state wherein a radio transmitter and/or a radio receiver is activated for such communication. An activation state may be seen as a state where a transceiver of a device is inactive, or at least partly inactive.

A power saving state as defined herein, may be seen as a dormant state, such as a state where a device, such as positioning device, slave anchor electronic device, master anchor electronic device, and/or time reference node, has no active connection with any other device. A power saving state may be seen as an inactive state of a device, such as positioning device, slave anchor electronic device, master anchor electronic device, and/or time reference node. A power saving state may be seen as a state where closed loop power control is inactivated or suspended. A power saving state may be seen as a state where a transceiver of a device is active, or at least partly active.

In one or more example systems, the first positioning device 300 is configured to determine, such as using the processor circuitry, the first positioning event using a timer of the first positioning device. In other words, the first positioning device 300 may be configured to initiate an updated positioning event periodically using the timer, such as every 1 s, every 2 s, every 10 s, or every 60 s to the next positioning event.

In one or more example systems, the first positioning device 300 comprises an inertial measurement device 304.

In one or more example systems, the first positioning device 300 is configured to detect, such as using the processor circuitry 302 and/or the inertial measurement device 304, an inertial measurement. The inertial measurement device 304 may comprise a movement sensor, such as an inertial measurement unit, IMU, an accelerometer, a gyroscope, and/or a magnetometer. The inertial measurement may comprise movement data, such as inertial measurement, IMU, data. The IMU data may comprise one or more of: accelerometer data, gyroscope data, and magnetometer data. The inertial measurement may comprise a time parameter. In some examples, the time parameter may be indicative of a time stamp associated with the inertial measurement, such as timestamped IMU data.

For example, the first positioning device 300 may detect an acceleration indicative of movement of the first positioning device 300.

In one or more example systems, the first positioning device 300 is configured to determine, such as using the processor circuitry 302, based on the inertial measurement, a positioning request. In other words, when the first positioning device 300 detects an inertial measurement, the first positioning device 300 may request to be positioned, such as request that the position of the first positioning device 300 has to be updated. The first positioning device 300 may request positioning as a result of the detection of a movement of the first positioning device 300. The first positioning device 300 may be configured to detect an inertial measurement in power saving state.

In one or more example systems, the first positioning device 300 is configured to determine, such as using the processor circuitry 302, a next positioning event based on the positioning request. In other words, the first positioning device 300 may determine the next positioning event where the first positioning device 300 has the opportunity to receive a plurality of signals from the plurality of slave anchor electronic devices in order to determine the position of the first positioning device. In other words, the first positioning device 300 may expect a next positioning event, such as a train of UWB signals from a plurality of slave anchor electronic devices. For example, there may be 200 μs between each slave anchor electronic device broadcast. A next positioning event may be determined based on the positioning request, the radio synchronization signal, and/or a pre-configuration of the first positioning device 300 comprising information indicative of a timing of the positioning events.

In one or more example systems, the first positioning device 300 comprises a wireless interface 303.

In one or more example systems, the first positioning device 300 is configured to receive, such as using the processor circuitry 302 and/or via the wireless interface 303, information indicative of an infrastructure event via the wireless interface 303 of the first positioning device. Information indicative of an infrastructure event may be seen as information, such as a time information message, based on which the first positioning device 300 may determine a next positioning event. The first positioning device 300 may be configured to receive information indicative of an infrastructure event in power saving state, such as an ultra-power saving state. An infrastructure event may for example be seen as an event where the master anchor electronic device 400A broadcasts a signal over a low power wireless interface (such as over a low power radio). The information indicative of an infrastructure event may comprise an information package that may be broadcasted over a low power wireless interface periodically, such as at higher frequency than the broadcasting of the UWB signals.

In one or more example systems, the first positioning device 300 is configured to determine, such as using the processor circuitry 302, a next positioning event based on the infrastructure event, such as based on the information indicating the infrastructure event. In other words, the first positioning device 300 may be configured to initiate a new/next position detection based on the infrastructure event.

In one or more example systems, the first positioning device 300 is configured to switch, such as using the processor circuitry 302, from a power saving state to an activation state of the first positioning device for the first positioning event. In other words, the first positioning device 300 may be configured to switch from a power saving state to an activation state based on the determined first positioning event. The first positioning device 300 may be in the power saving state until the first positioning event.

The first positioning device 300 may be configured to set a time to enter an activation state for the first positioning device, such as at the first positioning event.

In other words, the first positioning device 300 may be configured to switch from a power saving state to an activation state based on one or more of the time synchronization data, the timer, and/or the infrastructure event.

In other words, the first positioning device 300 may be configured to wake up at an activation time for the first positioning event to receive one or more signals, such as the second UWB signal 410B. The first positioning device 300 may be configured to switch from a power saving state to an activation state based on an activation signal. An activation signal may comprise an infrared signal detected via an infrared sensor and/or a light signal, such as a light pulse, detected via a photosensor. For example, when the first positioning device 300 comprises a light-powered cell, the light-powered cell may be used to detect a light pulse while providing power to the first positioning device 300.

In one or more example systems, the first positioning device 300 is configured to receive, such as using the processor circuitry 302 and/or via the wireless interface 303 the first UWB signal 410A. The first UWB signal 410A may allow the first positioning device 300 to synchronize (such as time synchronize) with the system 1, such as to synchronize with the master anchor electronic device 400A. An internal clock of the first positioning device 300 may be updated based on the first UWB signal.

In one or more example systems, prior to receiving the first UWB signal, the first positioning device 300 is configured to enter an activation state at a predetermined activation time of the first positioning device 300. In other words, the first positioning device 300 is configured to enter an activation state at a predetermined activation time to receive the first UWB signal 410A. In other words, the first positioning device 300 is configured to wake up at a predetermined activation time to receive the first UWB signal 410A. The predetermined activation time may be pre-configured on the first positioning device 300. In other words, the first positioning device 300 may be pre-synchronized by default. The first positioning device 300 may be configured to listen for a signal at the predetermined activation time. The first positioning device 300 may receive the first UWB signal 410A at the first predetermined time plus the time it takes for the first UWB signal 410A to arrive at the first positioning device 300.

In one or more example systems, the first positioning device 300 is configured to receive, such as using the processor circuitry 302 and/or via the wireless interface 303, the second UWB signal at the first positioning event. The first positioning device 300 may be configured to receive UWB signals from one or more slave anchor electronic devices, such as the first slave anchor electronic device 400B, a second slave anchor electronic device 400C, a third slave anchor electronic device 400D, and/or a fourth slave anchor electronic device 400E. The first positioning device 300 may be configured to receive at least three UWB signals, such as the first UWB signal, the second UWB signal, and a third UWB signal. In one or more example systems, the first positioning device 300 is configured to receive a plurality of broadcasts from a plurality of slave anchor electronic devices. More received UWB signal may increase accuracy of positioning but may also increase time of reception which may increase power consumption at the first positioning device 300. When the signals from the plurality of slave anchor electronic devices partially overlap, such as quasi simultaneous responses from the plurality of slave anchor electronic devices, the first positioning device 300 may save reduce the reception time of UWB signals and thereby reduce power consumption.

In one or more example systems, prior to receiving the second UWB signal, such as prior to the first positioning event, the first positioning device 300 is configured to enter an activation state. In other words, the first positioning device 300 is configured to enter an activation state at the first positioning event to receive the second UWB signal 410B. In other words, the first positioning device 300 is configured to wake up at the first positioning event to receive the second UWB signal 410B. The first positioning device 300 may be configured to listen for one or more UWB signals at the first positioning event. The first positioning device 300 may receive the second UWB signal 410B at the first transmission time of the second UWB signal 410B plus the time it takes for the second UWB signal 410A to arrive at the first positioning device 300.

By determining the first positioning event, such as a next positioning event, the synchronization, such as timing, for the first positioning device 300 to switch to the activation state for the first positioning event may be improved. The first positioning device 300 may therefore enter the activation state for receiving a suitable number of UWB signals at the first positioning event and thereby allow an improved and precise positioning.

In one or more example systems, the first positioning device 300 is configured to obtain, such as using the processor circuitry 302 and/or via the wireless interface 303, based on the first UWB signal 410A, the second UWB signal 410B, and a third UWB signal 410C from a second slave anchor electronic device 400C of the system 1, a first position parameter of the first positioning device 300.

To obtain a first position parameter of the first positioning device 300 may comprise to determine a first position parameter of the first positioning device 300 based on the first UWB signal 410A, the second UWB signal 410B, and the third UWB signal 410C.

In one or more example systems, the first positioning device 300 is configured to obtain, such as determine, the first position parameter by using time difference of arrival, TDOA, of the one or more UWB signals received by the first positioning device 300, such as the time difference of arrival of the first UWB signal 410A, the second UWB signal 410B, and the third UWB signal 410C. In other words, the first positioning device 300 is configured to obtain, such as determine, the first position parameter by using time difference of arrival, TDOA, technique. The relative time differences of departure of the plurality of UWB signals from the plurality of slave anchor electronic devices, such as the relative time differences of departure of the first UWB signal 410A, the second UWB signal 410B, and the third UWB signal 410C, may be predefined and known by the first positioning device 300. In one or more example systems, the identity and/or location of the plurality of slave anchor electronic devices, such as the identity and/or the position the first slave anchor electronic device 400B, the identity and/or the position of the second slave anchor electronic device 400C, and the identity and/or the position of the third slave anchor electronic device 400D may be predefined and known by the first positioning device 300.

An internal clock of the first positioning device 300 may be updated as part of obtaining/determining the first position parameter. The first positioning device 300 may thereby refrain from receiving a radio synchronization signal indicative of the next positioning event, such as for determining the next positioning event.

In one or more example systems, the obtaining of the first position parameter comprises to determine, such as using the processor circuitry of the first positioning device, first time data based on the first UWB signal, second time data based on the second UWB signal, and third time data based on the third UWB signal from a second slave anchor electronic device of the system. The first time data may comprise first time difference data, such as first time difference of arrival data for the first UWB signal. The second time data may comprise second time difference data, such as second time difference of arrival data for the second UWB signal. The third time data may comprise third time difference data, such as third time difference of arrival data for the third UWB signal.

The processor circuitry of the first positioning device may determine the first position parameter by using a look-up table stored on the memory circuitry of the first positioning device 300. The look-up table may comprise individual time differences for each individual slave anchor electronic device identity and return a unique position. A positioning accuracy of 0.5 m would require a table of 200*200=40000 entries for an area of 100*100 meters. Look-up tables may be precalculated for a whole site and pre-installed in positioning devices and/or loaded on demand in positioning devices when entering a new site. This allows to simplify calculations.

In one or more example systems, the first positioning device 300 is configured to transmit, such as using the processor circuitry 302 and/or via the wireless interface 303, the first time data, the second time data, and the third time data, from the first positioning device 300 to a location server 600 of the system 1. The location server 600 may be seen as a location engine comprising memory circuitry, processor circuitry, and a wireless interface, where the position of positioning devices, such as the position of the first positioning device 300 may be calculated centrally. The first positioning device 300 may thereby transmit the first time data, the second time data, and/or the third time data, to the location server 600 to avoid performing power consuming calculations locally at the first positioning device 300. In one or more example systems, the identity and/or location of the plurality of slave anchor electronic devices, such as the identity and/or the position the first slave anchor electronic device 400B, the identity and/or the position of the second slave anchor electronic device 400C, and the identity and/or the position of the third slave anchor electronic device 400D may be predefined and known by the location server 600. The location server 600 may therefore only need the first time data, the second time data, and the third time data, from the first positioning device 300 to determine a position of the first positioning device 300. The time data, such as the first time data, the second time data, and the third time data may comprise the raw data, such as raw measurements, of the first positioning device 300 for the first UWB signal, the second UWB signal, and the third UWB signal. The location server 600 may determine the first position parameter by using a look-up table stored on the memory circuitry of the location server 600. The look-up table may comprise individual time differences for each individual slave anchor electronic device identity and return a position parameter indicative of a unique position. A positioning accuracy of 0.5 m would require a table of 200*200=40000 entries for an area of 100*100 meters. Look-up tables may be precalculated for a whole site and pre-installed in positioning devices and/or loaded on demand in positioning devices when entering a new site.

It may be appreciated that when the anchor electronic devices operate in cells with the same relative anchor configuration, the same lookup table may be used for all cells. For example, a lookup table may be organized so that the lookup table can provide a position parameter as well as set of delays, for example, through a point quad tree.

In one or more example systems, the first positioning device 300 is configured to transmit, such as using the processor circuitry 302 and/or via the wireless interface 303, the first time data, the second time data, and/or the third time data, from the first positioning device to at least one anchor electronic device of the system 1, such as to the master anchor electronic device 400A and/or one or more of the slave anchor electronic devices 400B-400H of the system 1.

An anchor electronic device of the system 1 may determine the position of positioning devices, such as the position of the first positioning device 300. The first positioning device 300 may thereby transmit the first time data, the second time data, and/or the third time data, to at least one anchor electronic device to avoid performing power consuming calculations locally at the first positioning device 300. In one or more example systems, the identity and/or location of the plurality of slave anchor electronic devices, such as the identity and/or the position the first slave anchor electronic device 400B, the identity and/or the position of the second slave anchor electronic device 400C, and the identity and/or the position of the third slave anchor electronic device 400D may be predefined and known by the anchor electronic devices. The anchor electronic device may therefore only need the first time data, the second time data, and the third time data, from the first positioning device 300 to determine a position of the first positioning device 300.

In one or more example systems, the location server 600 and/or one of the anchor electronic devices 400A-400H are configured to determine, based on the first time data, the second time data, and the third time data, a first position parameter of the first positioning device. For example, time data (such as first time data, second time data, third time data) may comprise parameters indicative of time difference of arrival, TDOA.

In one or more example systems, the location server 600 and/or one of the anchor electronic devices 400A-400H are configured to determine, the first position parameter by using time difference of arrival, TDOA, of the one or more UWB signals received by the first positioning device 300, such as the time difference of arrival of the first UWB signal 410A, the second UWB signal 410B, and the third UWB signal 410C. In other words, the location server 600 and/or one of the anchor electronic devices 400A-400H are configured to determine, the first position parameter by using time difference of arrival, TDOA, technique. The location server 600 may be configured to transmit a signal 600A indicative of the first position parameter that has been determined to the first positioning device 300.

In one or more example systems, the master anchor electronic device 400A is light powered and/or battery powered.

In one or more example systems, the first slave anchor electronic device is light powered and/or battery powered.

In one or more example systems, the first positioning device is light powered and/or battery powered.

The system disclosed herein, such as the system 1, allows to use UWB anchor electronic device infrastructure with power saving features. This in turn allows to have a system including master anchor electronic device, first slave anchor electronic device, and/or the first positioning device, which are light powered and/or battery powered.

For an indoor infrastructure, such as an indoor system, the master anchor electronic device 400A, the first slave anchor electronic device 400B, and/or the first positioning device 300 may comprise one or more indoor light cells for powering the devices, such as photovoltaic light cells. The master anchor electronic device 400A, the first slave anchor electronic device 400B, and/or the first positioning device 300 may for example comprise a light cell having a size in the range of 10 mm$^2$ to 1000 mm$^2$. In one or more example systems, the power harvested by the light cells may be stored on a battery or capacitor. By having the master anchor electronic device 400A, the first slave anchor electronic device 400B, and the first positioning device 300 in power saving states for most of the time, the master anchor electronic device 400A, the first slave anchor electronic device 400B, and/or the first positioning device 300 may receive sufficient power from one or more light cells, such as indoor light cells. By having the master anchor electronic device 400A, the first slave anchor electronic device 400B, and/or the first positioning device 300 being battery powered, an improved flexibility and scalability for the systems disclosed herein may be achieved. For example, in industry environments where it is difficult to setup and maintain a powered infrastructure due to limited access to power, such as due to long distances to ceiling compared with an office environment for example, it may be advantageous to provide the master anchor electronic device 400A, the first slave anchor electronic device 400B, and/or the first positioning device 300 being light powered and/or battery powered.

An expected power consumption of the system disclosed herein which is based on an UWB infrastructure may be done in comparison to a BLE based infrastructure.

For example, a BLE positioning device may consume 6 pJ per advertisement (such as broadcast). A BLE positioning device may consume the following per advertisement (broadcast) that takes 376 μs to broadcast: 5.5 mA*376 μs*3 V=6 μJ.

For example, for an UWB infrastructure, a typical UWB signal is below or equal to 150 μs. For example, a power consumption for UWB radio may be 40 mA for transmission (TX) and 75 mA for reception (RX) compared with 5.5 mA for BLE.

A positioning event period for the system disclosed herein may be assumed to be 1 Hz.

For example, a master anchor electronic device may consume the following per broadcast of an UWB signal:

40 mA*0.15 ms*3 V=18 μJ. This is approximately three times the power consumption of a BLE broadcast.

A slave anchor electronic device may receive the UWB signal from the master anchor electronic device and transmit an UWB signal after a predetermined waiting time (delay). It may be assumed that the predetermined waiting time is 200 μs. It may be assumed that a preamble where the slave anchor electronic device listens for the master anchor electronic device broadcast is 50 μs. It may be assumed that the power consumption of the slave anchor electronic device is 10 mA between the reception and transmission.

A slave anchor electronic device may for example consume the following per reception and broadcast/transmission of an UWB signal based on the above assumptions:

(75 mA*0.2 ms+10 mA*0.2 ms+40 mA*0.15 ms)*3 V=69 μJ. This is approximately twelve times the power consumption of a BLE broadcast.

In one or more examples where the disclosed technique may be applied, it may be assumed that there is 200 μs between the slave anchor electronic device broadcasts of UWB signals. It may be assumed that the positioning device is in an active state (such as listens and/or receives) during the broadcast from one master anchor electronic device and two slave anchor electronic devices. The total time in active state for the positioning device is then 200 μs*3=600 μs. A positioning device can consume the following per positioning event based on the above assumptions:

75 mA*0.6 ms*3 V=135 μJ. This is approximately twenty-five times the power consumption of a BLE broadcast.

By having a system as disclosed herein where the master anchor electronic device, the plurality of slave anchor electronic devices, and the first positioning device may enter a power saving state more often the power consumption of the system disclosed herein which is based on an UWB infrastructure is therefore reduced/lowered compared to other systems and infrastructures using UWB. The power consumption of the system as disclosed herein may be reduced and with improved synchronization while providing a high accuracy of positioning.

However, as it may be seen in the above calculations, the technique as disclosed herein may still consume more power than techniques and systems based on BLE, but less than UWB without the disclosed technique.

In RSSI based RTLS system roughly five advertisements can be required to get a single position due to the need to average several detected values. In comparison with the disclosed technique a single positioning event is enough to get a single position.

A single positioning event would require a power consumption of twenty-five times a single BLE advertisement. A single positioning event using the technique disclosed herein would therefore require a power consumption of five times a single positioning event in a BLE RSSI based system.

The present disclosure therefore provides different ways of reducing the power consumption of the system further. The power consumption of the system disclosed herein may for example be reduced by reducing the position update frequency of the positioning device.

The power consumption of the system disclosed herein may for example be reduced by detecting an inertial measurement via an inertial measurement device of the positioning device, determining a position request based on the inertial measurement, and determining a next positioning event based on the positioning request. Thereby the number required positioning event may be reduced by only positioning the positioning device when movement is detected and/or stopped.

It may be appreciated that tracked items which are mostly not in movement, this can reduce power consumption by several magnitudes.

Another way of addressing the power consumption may be to increase the power output of light powered devices, such as by increasing the size of the light cells. For example, a size of a light cell may be 14 mm×14 mm. This size of light cell would increase the power output by eight compared with a cell of 5 mm×5 mm.

The power consumption of the system disclosed herein may for example be managed by having the disclosed system configured to adapt, such as scale, the positioning events (such as position updates) based on incoming light. This for example provides dynamic positioning events (such as position updates).

The power consumption of the system disclosed herein may for example be reduced by providing an architecture with simultaneous (such as quasi simultaneous) slave anchor electronic device broadcasts. This may for example reduce the power consumption by the number of anchor signals received by the tag which in the example above is three.

FIG. 2 shows a block diagram of an example positioning device 300 according to the disclosure. The positioning device 300 comprises memory circuitry 301, processor circuitry 302, and a wireless interface 303. Optionally, the first positioning device 300 comprises an inertial measurement device 304. The positioning device 300 may be configured to perform any of the methods disclosed in FIGS. 3A-3C.

The positioning device 300 is configured to receive (such as using the processor circuitry 302 and/or the wireless interface 303) a radio synchronization signal (such as radio synchronization signal 500A).

The positioning device 300 is configured to determine (such as using the processor circuitry 302) a first positioning event based on the radio synchronization signal.

The positioning device 300 is configured to enter (such as using the processor circuitry 302) a power saving mode until the first positioning event.

The wireless interface 303 is configured for wireless communications with a plurality of slave anchor electronic devices, a master anchor electronic device, and/or a time reference node. In other words, the wireless interface is configured to receive UWB signals and low power radio signals. The wireless interface 303 is configured for wireless communications, such as using one or more of: UWB, Bluetooth (such as BLE), ZigBee, infrared, and DASH7.

Figure 3A:
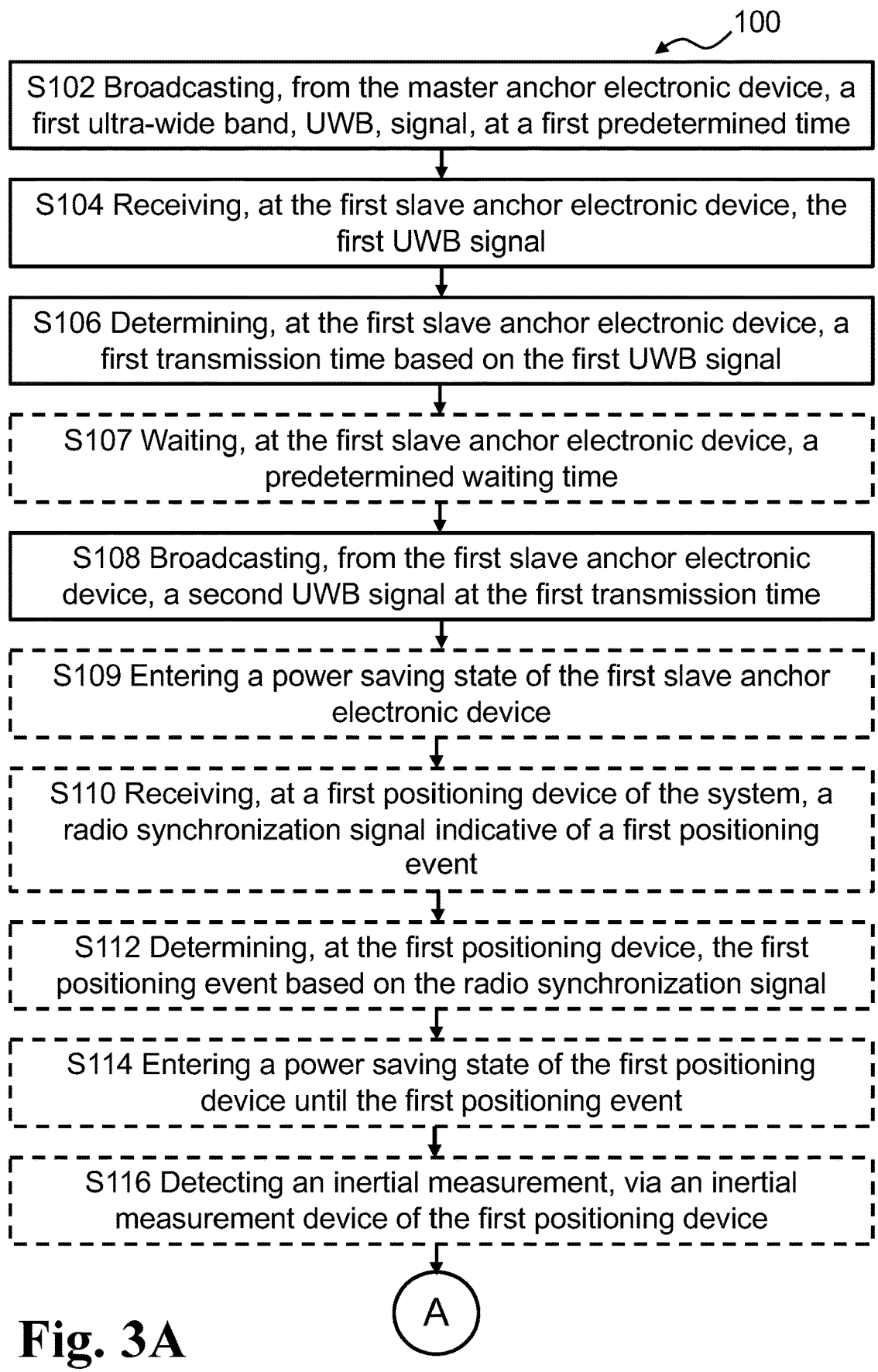
FIGS. 3A-C are flow-charts illustrating an example method, performed by a system comprising a master anchor electronic device, and a plurality of slave anchor electronic devices including a first slave anchor electronic device according to this disclosure.
Figure 3B:
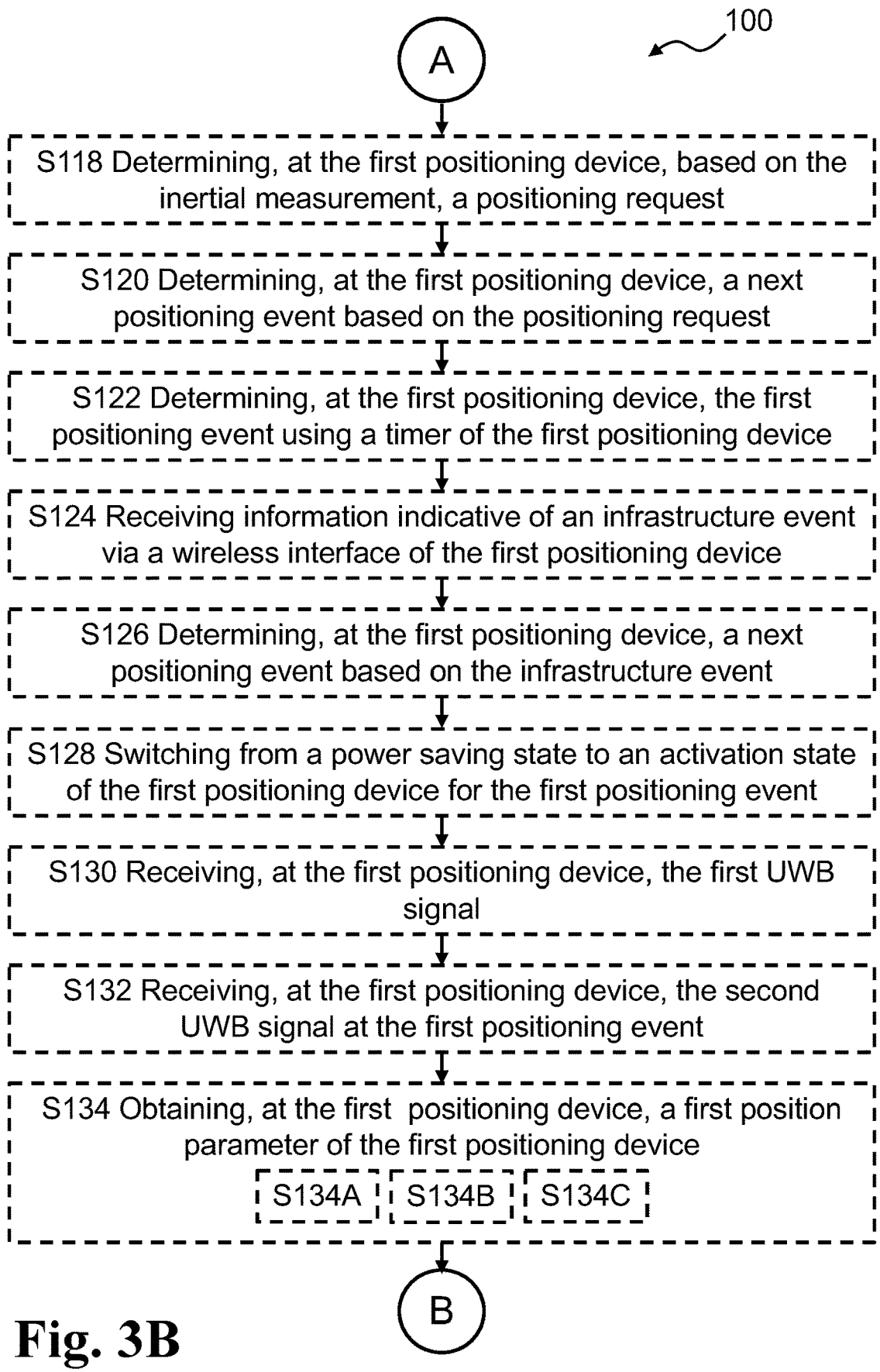
Figure 3C:
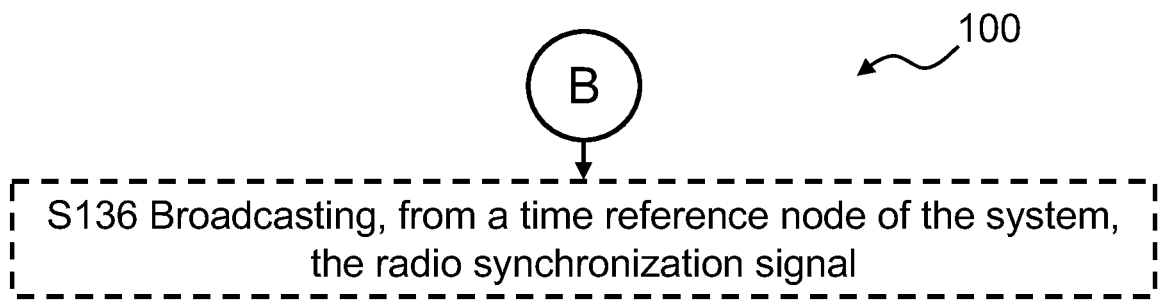

Processor circuitry 302 is optionally configured to perform any of the operations disclosed in FIG. 3A-3C (such as any one or more of S110, S112, S114, S116, S118, S120, S122, S124, S126, S128, S130, S132, S134, S134A, S134B). The operations of the positioning device 300 may be embodied in the form of executable logic routines (for example, lines of code, software programs, etc.) that are stored on a non-transitory computer readable medium (for example, memory circuitry 301) and are executed by processor circuitry 302).

Furthermore, the operations of the positioning device 300 may be considered a method that the positioning device 300 is configured to carry out. Also, while the described functions and operations may be implemented in software, such functionality may also be carried out via dedicated hardware or firmware, or some combination of hardware, firmware and/or software.

Memory circuitry 301 may be one or more of a buffer, a flash memory, a hard drive, a removable media, a volatile memory, a non-volatile memory, a random access memory (RAM), or other suitable device. In a typical arrangement, memory circuitry 301 may include a non-volatile memory for long term data storage and a volatile memory that functions as system memory for processor circuitry 302. Memory circuitry 301 may exchange data with processor circuitry 302 over a data bus. Control lines and an address bus between memory circuitry 301 and processor circuitry 302 also may be present (not shown in FIG. 2). Memory circuitry 301 is considered a non-transitory computer readable medium.

Memory circuitry 301 may be configured to store pre-configured time parameters (such as first predetermined time disclosed herein), first time data, second time data, third time data, position parameters, positioning events, and positions of slave anchor electronic devices and/or master anchor electronic device in a part of the memory.

FIGS. 3A-3C show a flow diagram of an example method 100, performed by a system according to the disclosure. The method 100 may be performed for determining a position of the positioning device. The method 100 may be performed for synchronization of positioning devices, and/or for synchronization of slave anchor electronic devices. The system comprises a master anchor electronic device, and a plurality of slave anchor electronic devices including a first slave anchor electronic device. The method 100 may be performed by a system disclosed herein, such as system 1 of FIG. 1.

The method 100 comprises broadcasting S102, from the master anchor electronic device, a first ultra-wide band, UWB, signal, at a first predetermined time. In one or more example methods, the first UWB signal may be seen as a signal transmitted using UWB, such as a "blink" signal. In one or more example methods, the first UWB signal may be indicative of or comprise time synchronization information for the plurality of slave anchor electronic devices, and/or time synchronization information for the first positioning device.

In one or more example methods, the first predetermined time may be pre-configured on the master anchor electronic device and/or any of the slave anchor electronic devices. In one or more example methods, the first UWB signal may comprise a master identity parameter indicative of the master anchor electronic device identity. An UWB signal, such as the first UWB signal may have a duration that is below or equal to 150 µs.

The method 100 comprises receiving S104, at the first slave anchor electronic device, the first UWB signal. In one or more example methods, the first UWB signal may allow the first slave anchor electronic device to synchronize (such as synchronize in time) with the system, such as to synchronize with the master anchor electronic device. In one or more example methods, an internal clock of the first slave anchor electronic device may be updated based on the first UWB signal. In one or more example methods, a slave anchor electronic device may have, as a default state, a power saving state. In one or more example methods, the method comprises entering, at a slave anchor electronic device, an activation state only for receiving a signal. In one or more example methods, each slave anchor electronic device may be in a power saving state with only an alarm setup for wake up at the first predetermined time and/or for a next positioning event.

The method 100 comprises determining S106, at the first slave anchor electronic device, a first transmission time based on the first UWB signal. In one or more example methods, the method 100 comprises determining, at the first slave anchor electronic device, the first transmission time based on the received first UWB signal, such as based on the time of reception of the first UWB signal. In one or more example methods, the method 100 comprises determining the first transmission time based on the first UWB signal and/or a pre-configured time period/time slot for the first slave anchor electronic device to transmit/broadcast at. In one or more example methods, the first transmission time may comprise and/or be based on a first delay of the first slave anchor electronic device. In one or more example methods, the first transmission time may be based on the reception time of the first UWB signal plus a predetermined delay of the first slave anchor electronic device.

The method 100 comprises broadcasting S108, from the first slave anchor electronic device, a second UWB signal at the first transmission time. In one or more example methods, the second UWB signal may be seen as a "blink" signal. In one or more example methods, the method 100 comprises transmitting, from the slave anchor electronic device, the second ultra-wide band, UWB, signal. In one or more example methods, the second UWB signal may comprise a slave identity parameter indicative of the slave anchor electronic device identity.

In one or more example methods, the method 100 comprises receiving S110, at a first positioning device of the system, a radio synchronization signal indicative of a first positioning event. In one or more example methods, the method 100 comprises transmitting the radio synchronization signal over a radio configured to communicate with lower power than that of UWB, such as power efficient narrow band radio, BLE, ZigBee, infrared, and/or DASH7. In one or more example methods, the method 100 comprises transmitting the radio synchronization signal at 2.4 GHz and/or below or equal to 1 GHz. By receiving the radio synchronization signal the first positioning device may synchronize for the first positioning event.

A positioning event, such as the first positioning event, may be seen as an event where a positioning device, such as the first positioning device, has the opportunity to receive a plurality of signals from the plurality of slave anchor electronic devices in order to determine the position of the positioning device. In one or more example methods, a positioning device, such as the first positioning device, may already comprise information on the next positioning event, such as the first positioning event. When the clock of the first positioning device is stable, the first positioning device may not need to receive a radio synchronization signal.

In one or more example methods, the method 100 comprises determining S112, at the first positioning device, the first positioning event based on the radio synchronization signal. In one or more example methods, the method 100 comprises determining the first positioning event based on a synchronization of the first positioning device based on the radio synchronization signal. In one or more example methods, the method 100 comprises determining the first positioning event based on a synchronization of the first positioning device, based on the radio synchronization signal, and/or based on a pre-configuration of the first positioning device comprising information indicative of a timing of the positioning event(s).

In one or more example methods, the method 100 comprises entering S114 a power saving state of the first positioning device until the first positioning event. In one or more example methods, the method 100 comprises setting, at the first positioning device, an alarm to enter an activation state, such as setting an alarm to wake up, at the first positioning event based on the determination of the first positioning event. In one or more example methods, the method 100 comprises entering, at the first positioning device, a power saving state after receiving the radio synchronization signal, after obtaining/determining the first positioning event, and/or after transmitting the time data to a location server and/or to one of the anchor electronic devices. The first positioning device may be configured to be in a power saving state by default.

In one or more example methods, the method 100 comprises detecting S116 an inertial measurement, via an inertial measurement device of the first positioning device. In one or more example methods, the method 100 comprises detecting, at the first positioning device, such as using the processor circuitry and/or the inertial measurement device, an inertial measurement. In one or more example methods, the inertial measurement device may comprise a movement sensor, such as an inertial measurement unit, IMU, an accelerometer, a gyroscope, and/or a magnetometer. In one or more example methods, the inertial measurement may comprise movement data, such as inertial measurement, IMU, data. The IMU data may comprise one or more of: accelerometer data, gyroscope data, and magnetometer data. The inertial measurement may comprise a time parameter. In some examples, the time parameter may be indicative of a time stamp associated with the inertial measurement, such as timestamped IMU data.

In one or more example methods, the method 100 comprises detecting, at the first positioning device, an acceleration indicative of movement of the first positioning device.

In one or more example methods, the method 100 comprises determining S118, at the first positioning device, based on the inertial measurement, a positioning request. In one or more example methods, when detecting an inertial measurement, the method 100 comprises requesting, at the positioning device, to be positioned, such as requesting that the position of the first positioning device has to be updated. In one or more example methods, the method 100 comprises requesting, at the first positioning device, positioning as a result of the detection of a movement of the first positioning device. In one or more example methods, the method 100 comprises detecting, at the first positioning device, an inertial measurement in power saving state.

In one or more example methods, the method 100 comprises determining S120, at the first positioning device, a next positioning event based on the positioning request. In one or more example methods, the method 100 comprises determining, at the first positioning device, the next positioning event where the first positioning device has the opportunity to receive a plurality of signals from the plurality of slave anchor electronic devices in order to determine the position of the first positioning device. In one or more example methods, the method comprises expecting, at the first positioning device, a next positioning event, such as a train of UWB signals from a plurality of slave anchor electronic devices. For example, there may be 200 μs between each slave anchor electronic device broadcast. In one or more example methods, the method comprises determining a next positioning event based on the positioning request, the radio synchronization signal, and/or a pre-configuration of the first positioning device comprising information indicative of a timing of the positioning events.

In one or more example methods, the method 100 comprises determining S122, at the first positioning device, the first positioning event using a timer of the first positioning device. In one or more example methods, the method 100 comprises initiating, at the first positioning device, an updated positioning event periodically using the timer, such as every 1 s, every 2 s, every 10 s, or every 60 s to the next positioning event.

In one or more example methods, the method 100 comprises receiving S124 information indicative of an infrastructure event via a wireless interface of the first positioning device. In one or more example methods, the method comprises receiving, at the first positioning device, such as using the processor circuitry and/or via the wireless interface, information indicative of an infrastructure event via the wireless interface of the first positioning device. Information indicative of an infrastructure event may be seen as information, such as a time information message, based on which the method 100 may comprise to determine, at the first positioning device a next positioning event. In one or more example methods, the method 100 comprises receiving, at the first positioning device, information indicative of an infrastructure event in power saving state, such as an ultra-power saving state. An infrastructure event may for example be seen as an event where the master anchor electronic device broadcasts the first UWB signal. The information indicative of an infrastructure event may comprise an information package that may be broadcasted over a low power wireless interface periodically, such as at higher frequency than the broadcasting of the UWB signals.

In one or more example methods, the method 100 comprises determining S126, at the first positioning device, a next positioning event based on the infrastructure event. In one or more example methods, the method 100 comprises initiating, at the first positioning device, a new/next position detection based on the infrastructure event.

In one or more example methods, the method 100 comprises switching S128 from a power saving state to an activation state of the first positioning device for the first positioning event. In one or more example methods, the method 100 comprises switching, at the first positioning device, from a power saving state to an activation state based on the determined first positioning event. The first positioning device may be in the power saving state until the first positioning event. In one or more example methods, the method 100 comprises setting, at the first positioning device, a time to enter an activation state for the first positioning device, such as at the first positioning event. In one or more example methods, the method 100 comprises switching, at the first positioning device, from a power saving state to an activation state based on one or more of the time synchronization data, the timer, and/or the infrastructure event.

In one or more example methods, the method 100 comprises waking up, the first positioning device, at an activation time for the first positioning event to receive one or more signals, such as the second UWB signal. In one or more example methods, the method 100 comprises switching, at the first positioning device, from a power saving state to an activation state based on an activation signal. An activation signal may comprise an infrared signal detected via an infrared sensor and/or a light signal, such as a light pulse, detected via a photosensor.

In one or more example methods, the method 100 comprises receiving S130, at the first positioning device, the first UWB signal. The first UWB signal may allow the first positioning device to synchronize (such as time synchronize) with the system, such as to synchronize with the master anchor electronic device. An internal clock of the first positioning device may be updated based on the first UWB signal.

In one or more example methods, prior to receiving the first UWB signal, the method 100 comprises entering, at the first positioning device, an activation state at a predetermined activation time of the first positioning device. In one or more example methods, the method 100 comprises entering, at the first positioning device, an activation state at a predetermined activation time to receive the first UWB signal. In one or more example methods, the method 100 comprises waking up, the first positioning device, at a predetermined activation time to receive the first UWB signal. The predetermined activation time may be pre-configured on the first positioning device. In one or more example methods, the first positioning device may be pre-synchronized by default. In one or more example methods, the method 100 comprises listening, at the first positioning device, for a signal at the predetermined activation time. In one or more example methods, the method 100 comprises receiving, at the first positioning device, the first UWB signal at the first predetermined time plus the time it takes for the first UWB signal to arrive at the first positioning device.

In one or more example methods, the method 100 comprises receiving S132, at the first positioning device, the second UWB signal at the first positioning event. In one or more example methods, the method 100 comprises receiving, at the first positioning device, UWB signals from one or more slave anchor electronic devices, such as the first slave anchor electronic device, a second slave anchor electronic device, a third slave anchor electronic device, and/or a fourth slave anchor electronic device. In one or more example methods, the method 100 comprises receiving, at the first positioning device, at least three UWB signals, such as the first UWB signal, the second UWB signal, and a third UWB signal. In one or more example methods, the method 100 comprises receiving, at the first positioning device, a plurality of broadcasts from a plurality of slave anchor electronic devices. More received UWB signal may increase accuracy of positioning but may also increase time of reception which may increase power consumption at the first positioning device. When the signals from the plurality of slave anchor electronic devices partially overlap, such as quasi simultaneous responses from the plurality of slave anchor electronic devices, the first positioning device may save reduce the reception time of UWB signals and thereby reduce power consumption. For example, the first UWB signal, second UWB signal, and/or the third UWB signal may at least partially overlap, such as be quasi simultaneous.

In one or more example methods, the method 100 comprises, prior to receiving the second UWB signal, such as prior to the first positioning event, entering, at the first positioning device, an activation state. In one or more example methods, the method 100 comprises entering, at the first positioning device, an activation state at the first positioning event for receiving the second UWB signal. In one or more example methods, the method 100 comprises waking up, the first positioning device, at the first positioning event to receive the second UWB signal. In one or more example methods, the method 100 comprises, listening, at the first positioning device, for one or more UWB signals at the first positioning event. In one or more example methods, the method 100 comprises receiving, at the first positioning device, the second UWB signal at the first transmission time of the second UWB signal plus the time it takes for the second UWB signal to arrive at the first positioning device.

By determining the first positioning event, such as a next positioning event, the synchronization, such as timing, for the first positioning device to switch to the activation state for the first positioning event may be improved. In one or more example methods, the method 100 comprises entering, at the first positioning device, the activation state for receiving a suitable number of UWB signals at the first positioning event and thereby allow an improved and precise positioning. A suitable number of UWB signals may be when the number of UWB signals satisfy a criterion, such as a positioning precision criterion. For example, more received UWB signals will increase accuracy but also increase time to receive, which will increase power consumption. The timing for activation (wake up) of a positioning device may have to be accurate enough to collect enough UWB signals (broadcasts) from the different anchor electronic devices. It may be appreciated that, this required accuracy may be lower than the accuracy to determine time difference of arrival of each of the UWB signals (such as blink messages).

In one or more example methods, the method 100 comprises obtaining S134, at the first positioning device, based on the first UWB signal, the second UWB signal, and a third UWB signal from a second slave anchor electronic device of the system, a first position parameter of the first positioning device.

In one or more example methods, the obtaining of a first position parameter of the first positioning device comprises determining of a first position parameter of the first positioning device based on the first UWB signal, the second UWB signal, and the third UWB signal.

In one or more example methods, the obtaining S134 of the first position parameter comprises determining S134A, at the first positioning device, first time data based on the first UWB signal, second time data based on the second UWB signal, and/or third time data based on the third UWB signal from a second slave anchor electronic device of the system. The first time data may comprise first time difference data, such as first time difference of arrival data for the first UWB signal. The second time data may comprise second time difference data, such as second time difference of arrival data for the second UWB signal. The third time data may comprise third time difference data, such as third time difference of arrival data for the third UWB signal.

For large infrastructures, such as large installations, with hundreds of anchor electronic devices, it may be possible to split up in separate independent cells (such as positioning cells). This may be seen as cell-based architecture. Different cells may be separated in different time slots, for example for separating their positioning events when the cells are close. A positioning device, such as the first positioning device, may need to determine which cell to position against. For example, when the position of the first positioning device is known, that position and the location of the different cells may be used to determine which cell to use. This may be used when the next position of the first positioning device is assumed to be close to the current position. Master anchor electronic devices may be placed near a center position of each cell. For example, the measured RSSI of a time reference signal, such as the first UWB signal and/or the time synchronization signal, may be used to determine which cell is nearby. Radio communication from a positioning device to a separate infrastructure may be supported to allow positioning device positions to be distributed to other services and/or when a location server reside in the infrastructure instead of the positioning device. In one or more example methods, when the cell and/or the position of the first positioning device is not known, the first positioning device may receive a plurality of radio synchronization signals from a plurality of time reference nodes and determine and/or select which cell is the closest based on for example RSSI strength. In other words, when the cell and/or the position of the first positioning device is not known, the first positioning device may listen to a plurality of radio synchronization signals from a plurality of time reference nodes and determine and/or select which cell is the closest based on for example RSSI strength. The first positioning device may thereby determine which cell to use.

In one or more example methods, the obtaining S134 of the first position parameter comprises determining, at the first positioning device, first time data based on the first UWB signal.

In one or more example methods, the obtaining S134 of the first position parameter comprises determining, at the first positioning device, second time data based on the second UWB signal.

In one or more example methods, the obtaining S134 of the first position parameter comprises determining S134A, at the first positioning device, third time data based on the third UWB signal.

In one or more example methods, obtaining S134 of the first position parameter at the first positioning device comprises determining, at the first positioning device, the first position parameter by using a look-up table stored on the memory circuitry of the first positioning device. The look-up table may comprise individual time differences for each individual slave anchor electronic device identity and return a unique position. A positioning accuracy of 0.5 m would require a table of 200*200=40000 entries for an area of 100*100 meters. Look-up tables may be precalculated for a whole site and pre-installed in positioning devices and/or loaded on demand in positioning devices when entering a new site.

In one or more example methods, the obtaining S134 of the first position parameter comprises transmitting S134B the first time data, the second time data, and/or the third time data, from the first positioning device to a location server of the system and/or at least one anchor electronic device of the system. The location server may be seen as a location engine comprising memory circuitry, processor circuitry, and a wireless interface, where the position of positioning devices, such as the position of the first positioning device may be calculated centrally. In one or more example methods, the method 100 comprises transmitting, from the first positioning device, the first time data, the second time data, and/or the third time data, to the location server to avoid performing power consuming calculations locally at the first positioning device. In one or more example methods, the identity and/or location of the plurality of slave anchor electronic devices, such as the identity and/or the position the first slave anchor electronic device, the identity and/or the position of the second slave anchor electronic device, and the identity and/or the position of the third slave anchor electronic device may be predefined and known by the location server. The location server may therefore only need the first time data, the second time data, and the third time data, from the first positioning device to determine a position of the first positioning device. The time data, such as the first time data, the second time data, and the third time data may comprise the raw data, such as raw measurements, of the first positioning device for the first UWB signal, the second UWB signal, and the third UWB signal.

In one or more example methods, the method 100 comprises determining, at the location server, the first position parameter by using a look-up table stored on the memory circuitry of the location server. The look-up table may comprise individual time differences for each individual slave anchor electronic device identity and return a unique position. A positioning accuracy of 0.5 m would require a table of 200*200=40000 entries for an area of 100*100 meters. Look-up tables may be precalculated for a whole site and pre-installed in positioning devices and/or loaded on demand in positioning devices when entering a new site.

In one or more example methods, the obtaining S134 of the first position parameter comprises determining S134C, based on the first time data, the second time data, and/or the third time data, at the location server of the system and/or one of the anchor electronic devices, a first position parameter of the first positioning device. In one or more example methods, the method 100 comprises determining, at an anchor electronic device of the system, the position of positioning devices, such as the position of the first positioning device. In one or more example methods, the method 100 comprises transmitting, from the first positioning device, the first time data, the second time data, and/or the third time data, to at least one anchor electronic device to avoid performing power consuming calculations locally at the first positioning device. In one or more example methods, the identity and/or location of the plurality of slave anchor electronic devices, such as the identity and/or the position the first slave anchor electronic device, the identity and/or the position of the second slave anchor electronic device, and the identity and/or the position of the third slave anchor electronic device may be predefined and known by the anchor electronic devices. The anchor electronic device may therefore only need the first time data, the second time data, and the third time data, from the first positioning device to determine a position of the first positioning device.

In one or more example methods, it may be assumed that anchor electronic device locations are known when the system is used for positioning. It may be possible to allow self-configuration for anchor electronic device locations using for example two-way ranging between anchor electronic devices to determine relative positioning between anchor electronic devices. The alignment of anchor electronic devices layout to for example a floor plan, may be performed by using a manual fixation technique of a few anchor electronic device locations on a floor plan.

In one or more example methods, the method 100 comprises, prior to receiving the first UWB signal, entering S103 an activation state of the first slave anchor electronic device at a predetermined activation time.

In one or more example methods, the method 100 comprises entering, at the first slave anchor electronic device, an activation state at a predetermined activation time to receive the first UWB signal. In one or more example methods, the method 100 comprises waking up, the first slave anchor electronic device, at a predetermined activation time for receiving the first UWB signal in line with the first predetermined time. In one or more example methods, the plurality of slave anchor electronic devices may be pre-synchronized by default. In one or more example methods, the method 100 comprises entering, at each slave anchor electronic device of the system, an activation state at a predetermined activation time to receive the first UWB signal. In one or more example methods, the method 100 comprises listening, at the first slave anchor electronic device, for a signal at the predetermined activation time. In one or more example methods, the method 100 comprises receiving, at the first slave anchor electronic device, the first UWB signal at a time that takes into account the first predetermined time and the time that it takes for the first UWB signal to arrive at the first slave anchor electronic device. In one or more example methods, the method 100 comprises setting, at a slave anchor electronic device, such as the first slave anchor electronic device, an alarm to enter an activation state, such as to set an alarm to wake up, at the first positioning event based on the first positioning event. In one or more example methods, it may be possible depending on a frequency of the positioning event, stability of slave anchor electronic device clock reference, and/or power consumption for keeping a high accuracy time reference running between positioning events, that the slave anchor electronic devices do not need to listen for the master anchor electronic device at every positioning event. In one or more example methods, it may be appreciated that the slave anchor electronic devices may be allowed to transmit/broadcast UWB signals (such as blink messages) at pre-defined delays from the first UWB signal. In one or more example methods, the slave anchor electronic devices may not need to synchronize with the master anchor electronic device at every positioning event. This may allow to save power at the slave anchor electronic devices. Each of the plurality of slave anchor electronic devices may be associated with different predetermined activation times (such as wake-up state).

In one or more example methods, the method 100 comprises, prior to broadcasting the second UWB signal, waiting S107, at the first slave anchor electronic device, a predetermined waiting time. In one or more example methods, the predetermined waiting time may be based on the first UWB signal and/or a preconfigured delay parameter. In one or more example methods, each of the plurality of slave anchor electronic devices may comprise a pre-configured time period/time slot for transmission and/or broadcast. In one or more example methods, the pre-configured time period/time slot for transmission and/or broadcast at may be different for each slave anchor electronic device to allow differentiation between the slave anchor electronic devices and/or to allow differentiation between the signals transmitted/broadcasted by the slave anchor electronic devices. In one or more example methods, there may be a delay between the broadcasting/transmission of each UWB signal from the plurality of slave anchor electronic devices. In one or more example methods, the signals from the plurality of slave anchor electronic devices may partially overlap, such as quasi simultaneous responses from the plurality of slave anchor electronic devices. In one or more example methods, the signals from the plurality of slave anchor electronic devices may be transmitted and/or broadcasted such that the signals do not interfere with each other.

In one or more example methods, the method 100 comprises receiving, at the first positioning device, such as using a processor circuitry and/or via a wireless interface of the first positioning device (such as processor circuitry 302 and/or via the interface 303 of FIG. 2), a radio synchronization signal indicative of a first positioning event. In one or more example methods, the method 100 comprises listening, at the first positioning device, to a radio synchronization signal. In one or more example methods, the method 100 comprises transmitting the radio synchronization signal over a radio configured to communicate with lower power than that of UWB, such as power efficient narrow band radio, BLE, ZigBee, infrared, and/or DASH7. In one or more example methods, the method 100 comprises transmitting the radio synchronization signal at 2.4 GHz and/or below or equal to 1 GHz. By receiving the radio synchronization signal the first positioning device may synchronize for the first positioning event.

A positioning event, such as the first positioning event, may be seen as an event where a positioning device, such as the first positioning device 300, has the opportunity to receive a plurality of signals from the plurality of slave anchor electronic devices in order to determine the position of the positioning device. In one or more example methods, a positioning device, such as the first positioning device, may already comprise information on the next positioning event, such as the first positioning event. When the clock of the first positioning device is stable, the first positioning device may not need to receive a radio synchronization signal.

In one or more example methods, the method 100 comprises entering S109 a power saving state of the first slave anchor electronic device. In one or more example methods, the method 100 comprises entering, at a slave anchor electronic device, an activation state only for receiving a signal. In one or more example methods, the method 100 comprises entering, at the first slave anchor electronic device, a power saving state, until receiving the first UWB signal, and/or between the reception of the first UWB signal and the broadcasting of a second UWB signal and/or after broadcasting a second UWB signal.

In one or more example methods, the method 100 comprises broadcasting S136, from a time reference node of the system, the radio synchronization signal. In one or more example methods, the method comprises receiving, at the time reference node, the first UWB signal. In one or more example methods, the time reference node may comprise a radio configured to communicate with lower power than that of UWB, (such as an ultra-low power wake-up radio, such as a power efficient narrow band radio, for example operating at 2.4 GHz and/or below or equal to 1 GHz, such as BLE, ZigBee, infrared, and/or DASH7), to further save power at the first positioning device. In one or more example methods, the method comprises transmitting, from the first positioning device, a signal, such as a query message, to the time reference node to initiate a broadcast from the time reference node.

In one or more example methods, the master anchor electronic device acts as the time reference node. In one or more example methods, the method comprises, when the master anchor electronic device acts as the time reference node, broadcasting the radio synchronization signal, such as time reference, periodically (such as by 10 Hz) to allow the first positioning device to synchronize to the next positioning event.

In one or more example methods, the master anchor electronic device is light powered and/or battery powered.

In one or more example methods, the first slave anchor electronic device is light powered and/or battery powered.

In one or more example methods, the first positioning device is light powered and/or battery powered.

Figure 4:
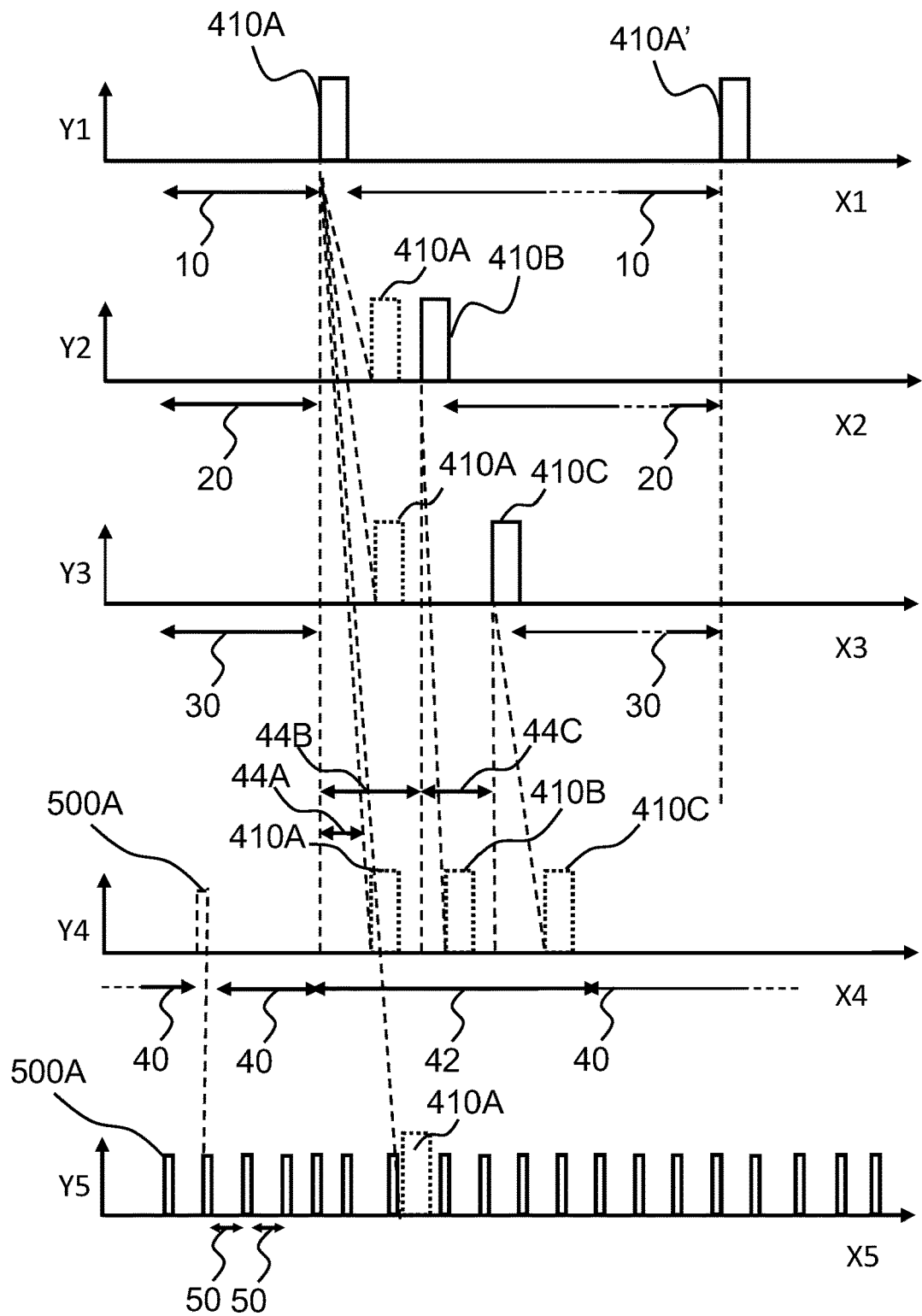
FIG. 4 is a schematic representation of example communication of signals and activity at a positioning device, and at the first slave anchor electronic device according to one or more embodiments of this disclosure.

FIG. 4 is a schematic representation of example communication of signals and activity at a master anchor electronic device, at a first slave anchor electronic device, and at a positioning device according to one or more embodiments of this disclosure (for example an overview of relative timing in positioning device, master anchor electronic device, slave anchor electronic device, and signals during flight).

The upper illustrative graph (X1, Y1) is a schematic example where the disclosed technique is applied, seen from the perspective of the master anchor electronic device. Y1 is a schematic representation indicative of communication of the master anchor electronic device on this axis. X1 is indicative of time. The master anchor electronic device broadcasts a first UWB signal 410A at a first predetermined time. The master anchor electronic device may be configured to be in a power saving state 10 (such as sleep state) as a default state and may be configured to enter an activation state (such as wake up) at the first predetermined time for synchronization of the slave anchor electronic devices and/or the first positioning device. The master anchor electronic device may be configured to be in a power saving state 10 before broadcasting the first UWB signal 410A. The master anchor electronic device may be configured to be in a power saving state 10 after broadcasting the first UWB signal 410A until the next broadcast of the next first UWB signal 410A. The master anchor electronic device may be configured to broadcast a first UWB signal periodically, such as illustrated by the next first UWB signal 410A'.

The middle illustrative graph (X2, Y2) is a schematic example where the disclosed technique is applied, seen from the perspective of the first slave anchor electronic device. The first slave anchor electronic device receives the first UWB signal 410A. In other words, the first slave anchor electronic device receives the first UWB signal 410A after the time of flight of the first UWB signal from the master anchor electronic device to the first slave anchor electronic device. The first slave anchor electronic device determines a first transmission time based on the first UWB signal 410A. In some embodiments, the first slave anchor electronic device may determine the first transmission time based on the first UWB signal 410A and pre-defined delays from the first UWB signal.

The first slave anchor electronic device broadcasts a second UWB signal 410B at the first transmission time. In some embodiments, the first slave anchor electronic device broadcasts the second UWB signal 410B after a pre-defined delays from the first UWB signal 410A.

The first slave anchor electronic device may be configured to be in a power saving state 20 (such as sleep state) as a default state and may be configured to enter an activation state at a predetermined activation time (such as wake up) for receiving the first UWB signal 410A. The slave anchor electronic device may be configured to be in a power saving state 20 between the reception of the first UWB signal 410A and the broadcasting of a second UWB signal 410B, and/or after broadcasting a second UWB signal 410B.

The middle illustrative graph (X3, Y3) is a schematic example where the disclosed technique is applied, seen from the perspective of the second slave anchor electronic device. The second slave anchor electronic device receives the first UWB signal 410A. In other words, the second slave anchor electronic device receives the first UWB signal 410A after the time of flight of the first UWB signal from the master anchor electronic device to the second slave anchor electronic device. The second slave anchor electronic device determines a second transmission time based on the first UWB signal 410A. In some embodiments, the second slave anchor electronic device may determine the second transmission time based on the first UWB signal 410A and pre-defined delays from the first UWB signal.

The second slave anchor electronic device broadcasts a third UWB signal 410C at the second transmission time. In some embodiments, the second slave anchor electronic device broadcasts the third UWB signal 410C after a pre-defined delays from the first UWB signal 410A.

The second slave anchor electronic device may be configured to be in a power saving state 30 (such as sleep state) as a default state and may be configured to enter an activation state at a predetermined activation time (such as wake up) for receiving the first UWB signal 410A. The slave anchor electronic device may be configured to be in a power saving 30 state between the reception of the first UWB signal 410A and the broadcasting of a third UWB signal 410C, and/or after broadcasting a third UWB signal 410C.

The middle illustrative graph (X4, Y4) is a schematic example where the disclosed technique is applied, seen from the perspective of the first positioning device. The first positioning device receives a radio synchronization signal 500A indicative of a positioning event. The radio synchronization signal 500A may be broadcasted from a time reference node. The first positioning device determines the first positioning event 42 based on the radio synchronization signal 500A.

The first positioning device enters a power saving state 40 of the first positioning device until the first positioning event. The first positioning device may be configured to set an alarm to enter an activation state, such as to set an alarm to wake up, at the first positioning event based on the determination of the first positioning event 42. The first positioning device may be configured to enter a power saving state 40 before receiving the radio synchronization signal 500A, after receiving the radio synchronization signal 500A, and/or after determining the first positioning event 42. The first positioning device may be configured to be in a power saving state 40 by default. The first positioning device receives the first UWB signal 410A at the first positioning event 42 (such as during the first positioning event). The first positioning device receives the second UWB signal 410B at the first positioning event (such as during the first positioning event). The first positioning device receives the third UWB signal 410C at the first positioning event (such as during the first positioning event). The relative time differences of departure of the plurality of UWB signals from the plurality of slave anchor electronic devices, such as the relative time differences of departure 44A of the first UWB signal 410A, the relative time differences of departure 44B of the second UWB signal 410B, and the relative time differences of departure 44C of the third UWB signal 410C, may be predefined and known by the first positioning device. In one or more examples, the identity and/or location of the plurality of slave anchor electronic devices, such as the identity and/or the position the first slave anchor electronic device, the identity and/or the position of the second slave anchor electronic device, and the identity and/or the position of the third slave anchor electronic device may be predefined and known by the first positioning device.

The bottom illustrative graph (X5, Y5) is a schematic example where the disclosed technique is applied, seen from the perspective of the time reference node. The time reference node broadcasts the radio synchronization signal 500A periodically, such as to allow the first positioning device to synchronize to the next positioning event. The time reference node may receive the first UWB signal 410A. In other words, the time reference node may receive the first UWB signal 410A after the time of flight of the first UWB signal from the master anchor electronic device to the time reference node. The first UWB signal 410A may allow the time reference node to synchronize (such as synchronize in time) with the system, such as to synchronize with the master anchor electronic device.

Figure 5:
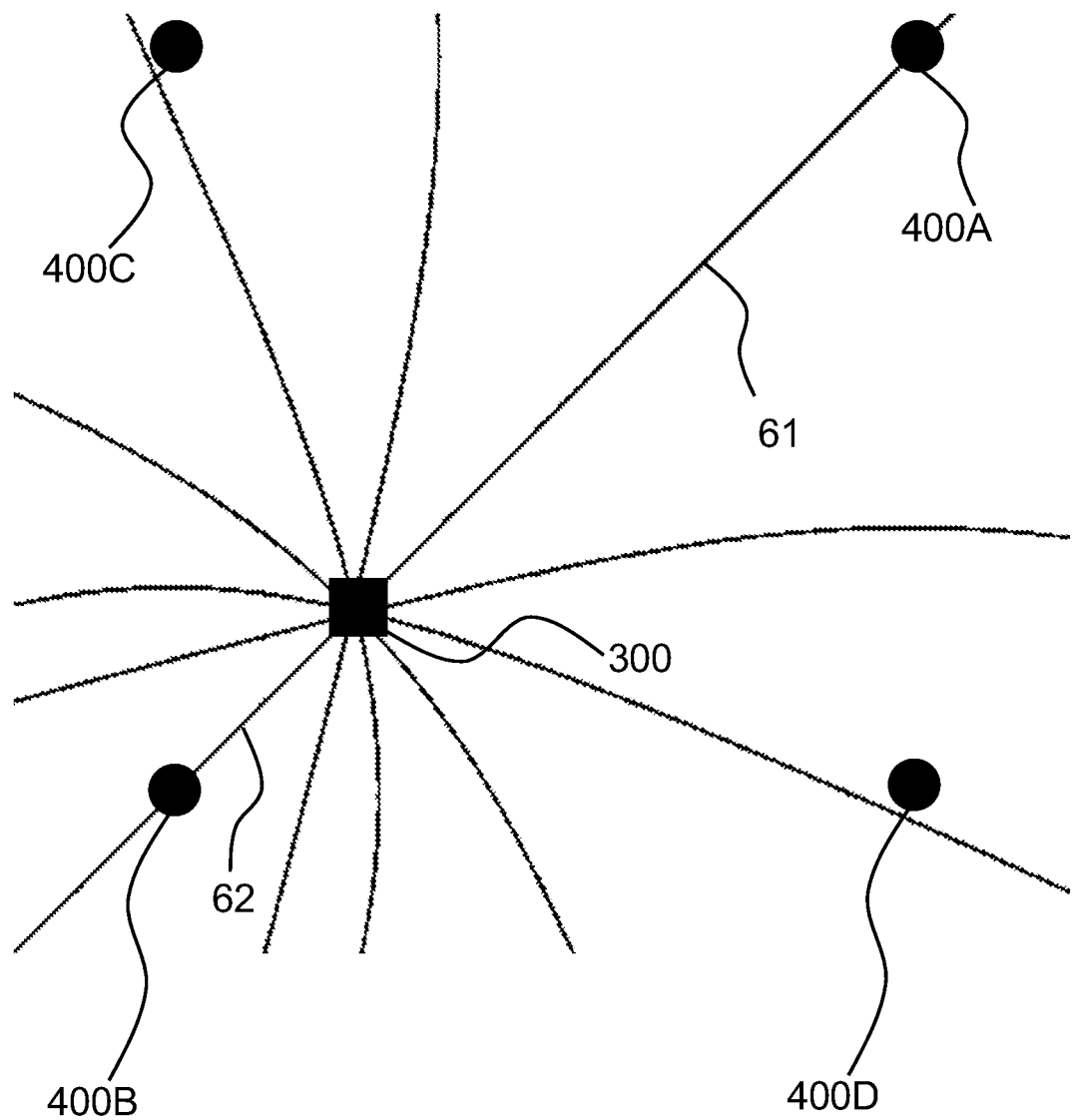
FIG. 5 is a schematic representation of a scenario of determination of a position of a positioning device according to one or more embodiments of this disclosure.

FIG. 5 is a schematic representation of a scenario of determination of a position of a positioning device according to one or more embodiments of this disclosure, such as the positioning device 300 of FIG. 1, where the disclosed technique is applied. In other words, FIG. 5 shows a two dimensional visualization of time difference of arrival, TDoA, measurements at the first positioning device 300.

An UWB signal from an anchor electronic device, such as the first UWB signal from the master anchor electronic device 400A, the second UWB signal from the first slave anchor electronic device 400B, the third UWB signal from the second slave anchor electronic device 400C, and the fourth UWB signal from the second slave anchor electronic device 400D, may result in time stamp differences at the first positioning device 300, leading to a plurality of time difference of arrival, TDoA, measurements. The time stamp differences may be used to calculate distances differences between pairs of anchor electronic devices. A time difference between two anchor electronic devices may be seen as a distance difference, where the distance difference (dist_diff) equals the time difference (time_diff) times the velocity of light (c): dist_diff=time_diff*c. The possible position parameters for the first positioning device 300 may be illustrated as hyperbola curves. In other words, a position (such as a valid position) of the first positioning device 300 in relation to a pair of anchor electronic devices may be described by a hyperbola curve. The hyperbola curves in FIG. 5 are defined by identifying distance differences illustrated as line 61 and line 62 that match along the hyperbola curves to each anchor electronic device, such as to the master anchor electronic device 400A, the first slave anchor electronic device 400B from each possible position of the first positioning device 300 on the hyperbola curve. The same may be performed for 400C and 400D. The difference in length of 61, 62 may be seen as the distance difference along a hyperbola curve. By having at least three anchor electronic devices, such as three hyperbola curves, the position of the first positioning device 300 may be determined. In the example in FIG. 5, four anchor electronic devices are used for determining the position of the first positioning device 300, such as three hyperbola curves.

Examples of methods, systems, slave anchor electronic devices, and positioning devices according to the disclosure are set out in the following items:

Item 1. A method, performed by a system comprising a master anchor electronic device, and a plurality of slave anchor electronic devices including a first slave anchor electronic device, the method comprising:
broadcasting (S102), from the master anchor electronic device, a first ultra-wide band, UWB, signal, at a first predetermined time;
receiving (S104), at the first slave anchor electronic device, the first UWB signal;
determining (S106), at the first slave anchor electronic device, a first transmission time based on the first UWB signal, and
broadcasting (S108), from the first slave anchor electronic device, a second UWB signal at the first transmission time.

Item 2. The method according to item 1, the method comprising:
receiving (S110), at a first positioning device of the system, a radio synchronization signal indicative of a first positioning event.

Item 3. The method according to item 2, the method comprising:
determining (S112), at the first positioning device, the first positioning event based on the radio synchronization signal; and
entering (S114) a power saving state of the first positioning device until the first positioning event.

Item 4. The method according to any of items 2-3, the method comprising:
detecting (S116) an inertial measurement, via an inertial measurement device of the first positioning device;
determining (S118), at the first positioning device, based on the inertial measurement, a positioning request; and
determining (S120), at the first positioning device, a next positioning event based on the positioning request.

Item 5. The method according to any of items 2-4, the method comprising:
determining (S122), at the first positioning device, the first positioning event using a timer of the first positioning device.

Item 6. The method according to any of items 2-5, the method comprising:
receiving (S124) information indicative of an infrastructure event via a wireless interface of the first positioning device; and determining (S126), at the first positioning device, a next positioning event based on the infrastructure event.

Item 7. The method according to any of items 2-6, the method comprising:
switching (S128) from a power saving state to an activation state of the first positioning device for the first positioning event.

Item 8. The method according to any of items 2-7, the method comprising:
receiving (S130), at the first positioning device, the first UWB signal.

Item 9. The method according to any of items 2-8, the method comprising:
receiving (S132), at the first positioning device, the second UWB signal at the first positioning event.

Item 10. The method according to item 9, the method comprising:
obtaining (S134), at the first positioning device, based on the first UWB signal, the second UWB signal, and a third UWB signal from a second slave anchor electronic device of the system, a first position parameter of the first positioning device.

Item 11. The method according to item 10, wherein obtaining the first position parameter comprises:
determining (S134A), at the first positioning device, first time data based on the first UWB signal, second time data based on the second UWB signal, and third time data based on the third UWB signal from a second slave anchor electronic device of the system;
transmitting (S134B) the first time data, the second time data, and the third time data, from the first positioning device to a location server of the system and/or at least one anchor electronic device of the system; and
determining (S134C), based on the first time data, the second time data, and the third time data, at the location server of the system and/or one of the anchor electronic devices, a first position parameter of the first positioning device.

Item 12. The method according to any of the previous items, wherein the method comprises: prior to receiving the first UWB signal:
entering (S103) an activation state of the first slave anchor electronic device at a predetermined activation time.

Item 13. The method according to any of the previous items, wherein the method comprises: prior to broadcasting the second UWB signal:
waiting (S107), at the first slave anchor electronic device, a predetermined waiting time.

Item 14. The method according to any of the previous items, the method comprising:
entering (S109) a power saving state of the first slave anchor electronic device.

Item 15. The method according to any of items 2-14, the method comprising broadcasting (S136), from a time reference node of the system, the radio synchronization signal.

Item 16. The method according to any of the previous items, wherein the master anchor electronic device acts as the time reference node.

Item 17. The method according to any of the previous items, wherein the master anchor electronic device is light powered and/or battery powered.

Item 18. The method according to any of the previous items, wherein the first slave anchor electronic device is light powered and/or battery powered.

Item 19. The method according to any of items 2-18, wherein the first positioning device is light powered and/or battery powered.

Item 20. A positioning device comprising processor circuitry, memory circuitry, and a wireless interface, wherein the positioning device is configured to:
receive a radio synchronization signal;
determine a first positioning event based on the radio synchronization signal; and
enter a power saving mode until the first positioning event.

Item 21. The positioning device according to item 20, where in the positioning device is configured to:
detect an inertial measurement, via an inertial measurement device of the positioning device;
determine, based on the inertial measurement, a positioning request; and
determine, based on the positioning request, a next positioning event.

Item 22. The positioning device according to items 20-21, where in the positioning device is configured to determine, the first positioning event using a timer of the positioning device.

Item 23. The positioning device according to items 20-22, where in the positioning device is configured to:
receive, via the wireless interface of the positioning device, information indicative of an infrastructure event; and
determine a next positioning event based on the infrastructure event.

Item 24. The positioning device according to items 20-23, wherein the positioning device is configured to switch from a power saving state to an activation state for the first positioning event.

Item 25. The positioning device according to items 20-24, wherein the positioning device is configured to receive a first UWB signal.

Item 26. The positioning device according to items 20-25, wherein the positioning device is configured to receive a second UWB signal at the first positioning event.

Item 27. The positioning device according to item 26, wherein the positioning device is configured to obtain, based on the first UWB signal, the second UWB signal, and a third UWB signal from a second slave anchor electronic device of the system, a first position parameter of the positioning device.

Item 28. The positioning device according to item 27, wherein the positioning device is configured to:
determine first time data based on the first UWB signal, second time data based on the second UWB signal, and third time data based on the third UWB signal; and
transmit the first time data, the second time data, and the third time data, from the positioning device to a location server of the system and/or at least one anchor electronic device of the system.

Item 29. The positioning device according to items 20-28, wherein the positioning device is light powered and/or battery powered.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering. Furthermore, the labelling of a first element does not imply the presence of a second element and vice versa.

It may be appreciated that Figures comprise some circuitries or operations which are illustrated with a solid line and some circuitries, components, features, or operations which are illustrated with a dashed line. Circuitries or operations which are comprised in a solid line are circuitries, components, features or operations which are comprised in the broadest example. Circuitries, components, features, or operations which are comprised in a dashed line are examples which may be comprised in, or a part of, or are further circuitries, components, features, or operations which may be taken in addition to circuitries, components, features, or operations of the solid line examples. It should be appreciated that these operations need not be performed in order presented. Furthermore, it should be appreciated that not all of the operations need to be performed. The example operations may be performed in any order and in any combination. It should be appreciated that these operations need not be performed in order presented. Circuitries, components, features, or operations which are comprised in a dashed line may be considered optional.

Other operations that are not described herein can be incorporated in the example operations. For example, one or more additional operations can be performed before, after, simultaneously, or between any of the described operations.

Certain features discussed above as separate implementations can also be implemented in combination as a single implementation. Conversely, features described as a single implementation can also be implemented in multiple implementations separately or in any suitable sub-combination. Moreover, although features may be described above as acting in certain combinations, one or more features from a claimed combination can, in some cases, be excised from the combination, and the combination may be claimed as any sub-combination or variation of any sub-combination It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the examples may be implemented at least in part by means of both hardware and software, and that several "means", "units" or "devices" may be represented by the same item of hardware.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than or equal to 10% of, within less than or equal to 5% of, within less than or equal to 1% of, within less than or equal to 0.1% of, and within less than or equal to 0.01% of the stated amount. If the stated amount is 0 (such as., none, having no), the above recited ranges can be specific ranges, and not within a particular % of the value. For example, within less than or equal to 10 wt./vol. % of, within less than or equal to 5 wt./vol. % of, within less than or equal to 1 wt./vol. % of, within less than or equal to 0.1 wt./vol. % of, and within less than or equal to 0.01 wt./vol. % of the stated amount.

The various example methods, devices, nodes, and systems described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program circuitries may include routines, programs, objects, components, data structures, etc. that perform specified tasks or implement specific abstract data types. Computer-executable instructions, associated data structures, and program circuitries represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claims, and it will be made obvious to those skilled in the art that various changes and modifications may be made without departing from the scope of the claims. The specification and drawings are, accordingly, to be regarded in an illustrative rather than restrictive sense. The claims are intended to cover all alternatives, modifications, and equivalents.

What is claimed is:

1. A method, performed by a system comprising a master anchor electronic device, and a plurality of slave anchor electronic devices including a first slave anchor electronic device, the method comprising:
   broadcasting, from the master anchor electronic device, a first ultra-wide band (UWB) signal, at a first predetermined time;
   receiving, at the first slave anchor electronic device, the first UWB signal;
   determining, at the first slave anchor electronic device, a first transmission time based on the first UWB signal; and
   broadcasting, from the first slave anchor electronic device, a second UWB signal at the first transmission time; and
   receiving, at a first positioning device of the system, a radio synchronization signal indicative of a first positioning event.

2. The method according to claim 1, the method comprising:
   determining, at the first positioning device, the first positioning event based on the radio synchronization signal; and
   entering a power saving state of the first positioning device until the first positioning event.

3. The method according to claim 1, the method comprising:
   detecting an inertial measurement, via an inertial measurement device of the first positioning device;
   determining, at the first positioning device, based on the inertial measurement, a positioning request; and determining, at the first positioning device, a next positioning event based on the positioning request.

4. The method according to claim 1, the method comprising:

determining, at the first positioning device, the first positioning event using a timer of the first positioning device.

5. The method according to claim 1, the method comprising:

receiving information indicative of an infrastructure event via a wireless interface of the first positioning device; and determining, at the first positioning device, a next positioning event based on the infrastructure event.

6. The method according to claim 1, the method comprising:

switching from a power saving state to an activation state of the first positioning device for the first positioning event.

7. The method according to claim 1, the method comprising:

receiving, at the first positioning device, the first UWB signal.

8. The method according to claim 1, the method comprising:

receiving, at the first positioning device, the second UWB signal at the first positioning event.

9. The method according to claim 8, the method comprising:

obtaining, at the first positioning device, based on the first UWB signal, the second UWB signal, and a third UWB signal from a second slave anchor electronic device of the system, a first position parameter of the first positioning device.

\* \* \* \* \*